US012566948B2

(12) United States Patent
Guan et al.

(10) Patent No.: US 12,566,948 B2
(45) Date of Patent: Mar. 3, 2026

(54) COMPUTATION UNIT, RELATED APPARATUS, AND METHOD

(71) Applicant: Alibaba Group Holding Limited, Georgetown (KY)

(72) Inventors: Yijin Guan, Beijing (CN); Fei Sun, Sunnyvale, CA (US); Junwen Luo, Shanghai (CN); Haoran Li, Shanghai (CN); Bangyan Wang, Shanghai (CN); Tianchan Guan, Shanghai (CN); Yawen Zhang, Shanghai (CN)

(73) Assignee: Alibaba Group Holding Limited, Grand Cayman (KY)

( * ) Notice: Subject to any disclaimer, the term of this patent is extended or adjusted under 35 U.S.C. 154(b) by 1165 days.

(21) Appl. No.: 17/510,217

(22) Filed: Oct. 25, 2021

(65) Prior Publication Data

US 2022/0147804 A1     May 12, 2022

(51) Int. Cl.
| | |
|---|---|
| *G06N 3/063* | (2023.01) |
| *G06F 5/10* | (2006.01) |
| *G06F 7/544* | (2006.01) |

(52) U.S. Cl.
CPC .............. *G06N 3/063* (2013.01); *G06F 5/10* (2013.01); *G06F 7/5443* (2013.01)

(58) Field of Classification Search
CPC .............................. G06F 7/5443; G06N 3/063
See application file for complete search history.

(56) References Cited

U.S. PATENT DOCUMENTS

| | | | |
|---|---|---|---|
| 11,087,519 B2 | 8/2021 | Chen et al. | |
| 11,106,972 B1 | 8/2021 | Verheyen et al. | |
| 11,134,155 B1 | 9/2021 | Wyss et al. | |
| 2016/0307095 A1* | 10/2016 | Li | G06N 3/02 |
| 2020/0242474 A1* | 7/2020 | Lo | H03M 7/702 |
| 2020/0301994 A1* | 9/2020 | Dikici | G06N 3/063 |
| 2020/0349216 A1* | 11/2020 | Das Sarma | G06F 9/30036 |
| 2021/0221455 A1 | 7/2021 | Wang et al. | |
| 2021/0224286 A1 | 7/2021 | Wu et al. | |
| 2021/0224586 A1 | 7/2021 | Wang et al. | |
| 2021/0232902 A1 | 7/2021 | Gupta et al. | |
| 2021/0232941 A1 | 7/2021 | Wei et al. | |
| 2021/0247427 A1 | 8/2021 | Petladwala et al. | |
| 2021/0256752 A1 | 8/2021 | Chen | |

(Continued)

*Primary Examiner* — Michael D. Yaary

(57) ABSTRACT

This disclosure provides a computation unit, a related apparatus, and a method. The computation unit includes: a weight buffer adapted to store a row vector fetched from an $M \times K\alpha$ sparsified weight matrix, where M and K are respectively a number of rows and a number of columns of the weight matrix before being sparsified, and $\alpha$ is a sparsity coefficient; an excitation buffer adapted to store a $K \times N$ excitation matrix; an index selector adapted to store a selection index corresponding to the row vector, and select a row of the excitation matrix based on the selection index, to obtain a $K\alpha \times N$ selected excitation matrix; and a dot product computation unit adapted to multiply the row vector by the selected excitation matrix. This disclosure implements a manner of running a DNN on hardware. In such a manner, structured sparsity of a DNN can be fully utilized, so that inference efficiency is improved; moreover, a register file occupies relatively small bandwidth, and a timing constraint is weak.

20 Claims, 17 Drawing Sheets

(56) References Cited

U.S. PATENT DOCUMENTS

| | | | |
|---|---|---|---|
| 2021/0266323 | A1 | 8/2021 | Jani et al. |
| 2021/0269087 | A1 | 9/2021 | Zhao et al. |
| 2021/0279576 | A1 | 9/2021 | Shazeer et al. |
| 2021/0286620 | A1 | 9/2021 | Heinecke et al. |
| 2021/0291364 | A1 | 9/2021 | Li |
| 2021/0294875 | A1 | 9/2021 | Komuravelli et al. |
| 2021/0303907 | A1 | 9/2021 | Maity et al. |
| 2021/0303909 | A1* | 9/2021 | Gunnam .............. G06V 10/764 |
| 2021/0307832 | A1 | 10/2021 | Chen et al. |

* cited by examiner

| Deep neural network running solution | Matrix scaling solution | Matrix parameter | | | Occupied bandwidth | | | | | | Number of register file read/write |
|---|---|---|---|---|---|---|---|---|---|---|---|
| | | M | N | K | A-induced bandwidth (bits/cycle) | B-induced bandwidth (bits/cycle) | Selection-index-induced bandwidth (bits/cycle) | Sum of the three (bits/cycle) | Other bandwidth (bits/cycle) | Total occupied bandwidth (bits/cycle) | |
| A: Excitation matrix | Increase M | 32 | 16 | 16 | 512 | 256 | 32 | 800 | 1024 | 1824 | 33 |
| B: Weight matrix | Increase N | 16 | 32 | 16 | 512 | 128 | 16 | 656 | 1024 | 1680 | 36.5 |
| A: Weight matrix | Increase M | 32 | 16 | 16 | 256 | 256 | 32 | 544 | 1024 | 1568 | 33 |
| B: Excitation matrix | Increase N | 16 | 32 | 16 | 256 | 512 | 32 | 800 | 1024 | 1824 | 36.5 |

FIG. 9

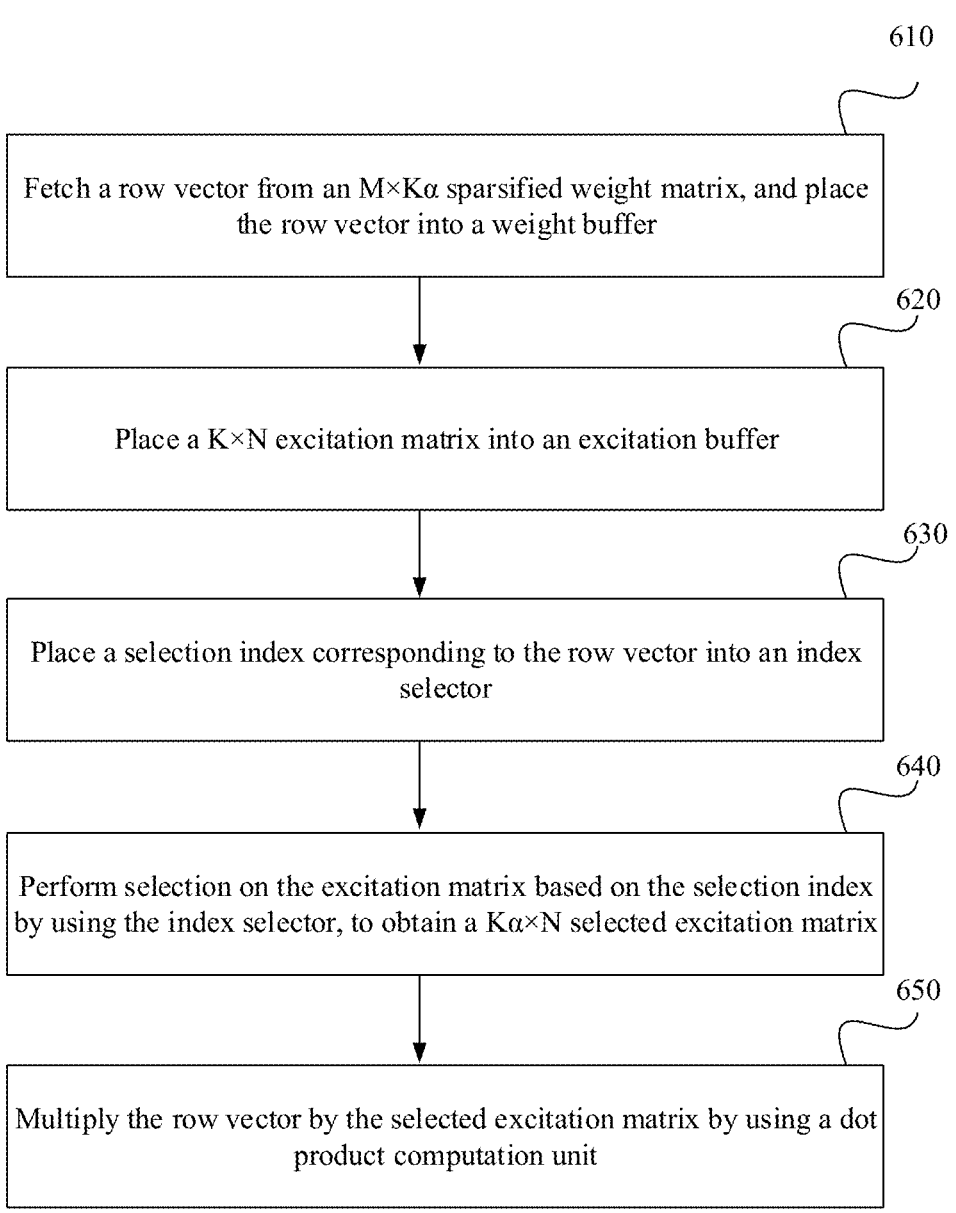

Fetch a row vector from an M×Kα sparsified weight matrix, and place the row vector into a weight buffer Place a K×N excitation matrix into an excitation buffer Place a selection index corresponding to the row vector into an index selector Perform selection on the excitation matrix based on the selection index by using the index selector, to obtain a Kα×N selected excitation matrix Multiply the row vector by the selected excitation matrix by using a dot product computation unit

FIG. 10

COMPUTATION UNIT, RELATED APPARATUS, AND METHOD

TECHNICAL FIELD

This disclosure relates to the chip field, and more specifically, to a computation unit, a related apparatus, and a method.

BACKGROUND

Deep neural networks (DNN) are widely applied in the artificial intelligence field. To reduce computation intensity and memory overheads of DNNs, prior research has proposed massive network pruning techniques to remove redundant connections in DNNs. A deep neural network has a plurality of layers of nodes, and each node is connected to a node of a previous layer, that is, each node receives an output from a node of a previous layer as an input, and performs an operation (such as multiplication or convolution) on the input and a weight of the node. A pruning technique is equivalent to changing values of a large number of weights in a weight matrix to 0, so as to increase sparsity of the weight matrix. No operation needs to be performed on zero-valued weights. In this way, computation intensity and memory overheads are reduced. Among all pruning methods, structured pruning is a promising pruning technique to be efficiently implemented on hardware. Structured sparsity caused by structured pruning typically presents a fixed pattern and distribution, for example, values of 50% of weights in a weight matrix are 0, which is quite hardware-friendly.

However, the foregoing pruning technique is focused on DNN implementation on software. When a DNN needs to be deployed on hardware for execution, currently there are two hardware deployment manners. One is implementing a DNN by using a conventional tensor engine or core dedicated for dense DNN inference. In this manner, structured sparsity of a DNN cannot be fully utilized. The other is a weight-reuse-based tensor engine design manner. In this manner, a register file occupies relatively large bandwidth, and a timing constraint is relatively strong.

SUMMARY

In view of this, this disclosure is intended to implement a manner of running a DNN on hardware. In such a manner, structured sparsity of a DNN can be fully utilized, so that inference efficiency is improved; moreover, a register file occupies relatively small bandwidth, and a timing constraint is weak.

According to one aspect of this disclosure, a computation unit is provided, including:

a weight buffer adapted to store a row vector fetched from an $M \times K\alpha$ sparsified weight matrix, where M and K are respectively a number of rows and a number of columns of the weight matrix before being sparsified, and $\alpha$ is a sparsity coefficient;

an excitation buffer adapted to store a $K \times N$ excitation matrix;

an index selector adapted to store a selection index corresponding to the row vector, and select a row of the excitation matrix based on the selection index, to obtain a $K\alpha \times N$ selected excitation matrix; and a dot product computation unit adapted to multiply the row vector by the selected excitation matrix.

Optionally, there are L weight buffers for respectively storing L row vectors that are sequentially fetched from the sparsified weight matrix, there are L index selectors for respectively storing selection indexes corresponding to the L row vectors, and there are $L \cdot N$ dot product computation units for respectively multiplying the L row vectors by N column vectors in the selected excitation matrix.

Optionally, $L=2$.

Optionally, $\alpha=50\%$.

Optionally, the dot product computation unit sets M/L clock cycles for multiplication of the weight matrix and the excitation matrix, where M is an integer multiple of L; and in a single clock cycle, the row vector in the weight buffer is multiplied by the N column vectors in the selected excitation matrix by using N dot product computation units corresponding to the row vector.

Optionally, the row vector is loaded to the weight buffer a first predetermined number of clock cycles before a clock cycle in which the dot product computation unit performs a multiplication operation on the row vector.

Optionally, the first predetermined number is 1.

Optionally, the selection index is loaded to the index selector a second predetermined number of cycles before a clock cycle in which the dot product computation unit performs a multiplication operation on the selected excitation matrix obtained through selection based on the selection index.

Optionally, the second predetermined number is 1.

Optionally, the excitation matrix is loaded to the excitation buffer a third predetermined number of cycles before a clock cycle in which the dot product computation unit performs a multiplication operation on the first selected excitation matrix obtained through selection from the excitation matrix, and is retained for M/L clock cycles.

Optionally, the third predetermined number is M/L+1.

Optionally, the computation unit further includes:

a candidate excitation buffer adapted to store a next excitation matrix, where once the excitation matrix is unloaded from the excitation buffer, the next excitation matrix stored in the candidate excitation buffer is loaded to the excitation buffer.

Optionally, the excitation buffer includes a first excitation buffer and a second excitation buffer that serve as ping-pong buffers, respectively adapted to store a current excitation matrix and a next excitation matrix, where the first excitation buffer and the second excitation buffer are both connected to the index selector, and after the dot product computation unit completes multiplication of each row vector in the sparsified weight matrix and a selected current excitation matrix, the index selector switches to selection in the second excitation buffer.

According to one aspect of this disclosure, an acceleration unit is further provided, including:

an instruction buffer adapted to buffer a to-be-executed instruction;

the computation unit described above;

a sequencer adapted to fetch the to-be-executed instruction from the instruction buffer, and if the to-be-executed instruction is a multiplication instruction on the sparsified weight matrix and the excitation matrix, allocate the multiplication instruction to the computation unit; and an on-chip memory adapted to store the sparsified weight matrix and the excitation matrix for loading to the weight buffer and the excitation buffer respectively.

According to one aspect of this disclosure, a computing apparatus is further provided, including:

a memory adapted to store a to-be-executed instruction;

a processing unit adapted to load the to-be-executed instruction, and if the to-be-executed instruction is an instruction to be executed by the acceleration unit send the to-be-executed instruction to the acceleration unit for execution; and the acceleration unit described above.

According to one aspect of this disclosure, a system on chip is further provided, including the acceleration unit described above.

According to one aspect of this disclosure, a data center is further provided, including the computing apparatus described above.

According to one aspect of this disclosure, a deep neural network running method is further provided, including:

fetching a row vector from an M×Kα sparsified weight matrix, and placing the row vector into a weight buffer, where M and K are respectively a number of rows and a number of columns of the weight matrix before being sparsified, and α is a sparsity coefficient;

placing a K×N excitation matrix into an excitation buffer;

placing a selection index corresponding to the row vector into an index selector;

performing selection on the excitation matrix based on the selection index by using the index selector, to obtain a Kα×N selected excitation matrix; and multiplying the row vector by the selected excitation matrix by using a dot product computation unit.

Optionally, there are L weight buffers; and the fetching a row vector from an M×Kα sparsified weight matrix, and placing the row vector into a weight buffer includes: sequentially fetching L row vectors from the sparsified weight matrix, and placing the L row vectors into the L weight buffers respectively.

Optionally, there are L index selectors; and the placing a selection index corresponding to the row vector into an index selector includes: placing selection indexes corresponding to the L row vectors into the L index selectors.

Optionally, there are L·N dot product computation units; and the multiplying the row vector by the selected excitation matrix by using a dot product computation unit includes: multiplying the L row vectors by N column vectors in the selected excitation matrix by using the L·N dot product computation units respectively.

Optionally, the multiplying the row vector by the selected excitation matrix includes: setting NL clock cycles for multiplication of the weight matrix and the excitation matrix, where M is an integer multiple of L; and in a single clock cycle, multiplying the row vector in the weight buffer by the N column vectors in the selected excitation matrix by using N dot product computation units corresponding to the row vector.

Optionally, the fetching a row vector from an M×Kα sparsified weight matrix, and placing the row vector into a weight buffer includes: placing the fetched row vector into the weight buffer a first predetermined number of cycles before a clock cycle in which the dot product computation unit performs a multiplication operation on the row vector.

Optionally, the placing a selection index corresponding to the row vector into an index selector includes: placing the selection index into the index selector a second predetermined number of cycles before a clock cycle in which the dot product computation unit performs a multiplication operation on the selected excitation matrix obtained through selection based on the selection index.

Optionally, the placing a K×N excitation matrix into an excitation buffer includes: placing the excitation matrix into the excitation buffer a third predetermined number of cycles before a clock cycle in which the dot product computation unit performs a multiplication operation on the first selected excitation matrix obtained through selection from the excitation matrix, and retaining the excitation matrix for M/L clock cycles.

Compared with a solution in which a DNN is implemented by using a conventional computation unit or core dedicated for dense DNN inference, in embodiments of this disclosure, the weight buffer does not need to store the M×K weight matrix that is not sparsified, but needs to store only the M×Kα sparsified weight matrix, and therefore, required storage bandwidth is reduced. In addition, because only the sparsified weight matrix is stored, zero-valued weights are excluded from operations, so that structured sparsity of a DNN is fully utilized, thereby improving inference efficiency. Compared with a weight-reuse-based computation unit, practice has proved that the computation unit in this disclosure can minimize occupied register file bandwidth when a specific matrix parameter (number of rows or number of columns) is used; moreover, the computation unit in this disclosure does not have a ping-pong buffer design in the weight-reuse-based computation unit, and therefore is free of a timing constraint.

BRIEF DESCRIPTION OF DRAWINGS

The foregoing and other objectives, features, and advantages of this disclosure will become clearer by referring to descriptions of embodiments of this disclosure with reference to the accompanying drawings below. In the accompanying drawings:

FIG. 9 shows a comparison between occupied bandwidths and other consumption parameters of excitation-reuse-based sparse DNN inference and weight-reuse-based sparse DNN inference in different matrix scaling solutions; and FIG. 10 is a flowchart of a deep neural network running method according to an embodiment of this disclosure.

DESCRIPTION OF EMBODIMENTS

Figure 1:
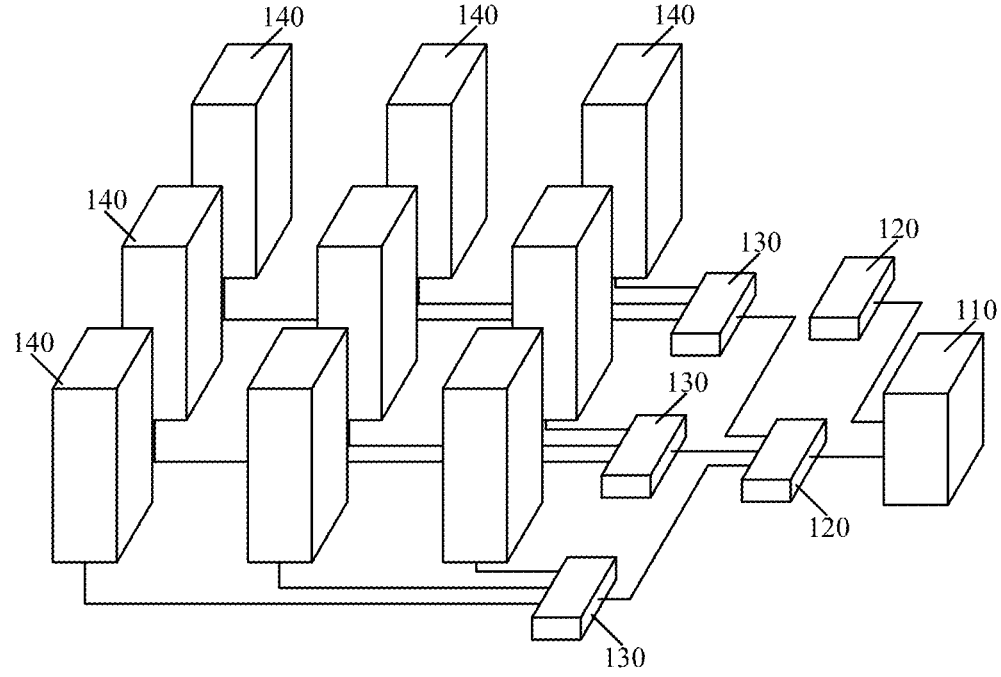
FIG. 1 is a structural diagram of a data center applied in an embodiment of this disclosure.

The following describes this disclosure based on embodiments, but this disclosure is not limited to these embodiments only. In the following detailed descriptions of this disclosure, some particular details are described in detail. Without the descriptions of these details, a person skilled in the art can still completely comprehend this disclosure. To avoid confusion in the essence of this disclosure, methods, processes, and procedures of common sense are not described in detail. In addition, the accompanying drawings are not necessarily graphed in proportion.

The following terms are used in this specification.

Deep neural network (DNN): A deep learning network is anew research direction in the machine learning field, and introduces machine learning, so as to be closer to an initial objective: artificial intelligence (AI). A deep learning network learns an inherent law and a representation hierarchy of sample data, and these pieces of information obtained in a learning process are considerably helpful for interpreting data such as text, an image, and a sound. An ultimate objective of deep learning networks is to enable machines to analyze and learn like human beings, so that machines can recognize data such as text, images, and sounds.

Weight matrix: A deep neural network has a plurality of layers of nodes, and each node is connected to a node of a previous layer, that is, each node receives an output from a node of a previous layer as an input, and processes the input to generate an output that is to be output to anode of a next layer. An input into each node includes outputs from a plurality of nodes of a previous layer, and an output from each node includes different outputs to a plurality of nodes of a next layer. Therefore, an input into/output from each node is not a single value, but presents a form of a vector or matrix (the input may be represented as a vector when outputs from a plurality of nodes of a previous layer are received at a single time point, and may be represented as a matrix because the plurality of nodes of the previous layer have different outputs at different time points), and an output from each node may also be represented in a form of a vector or matrix (the output may be represented as a vector when the output is output to a plurality of nodes of a next layer at a single time point, and may be represented as a matrix because different outputs are output to the plurality of nodes of the next layer at different time points). It may be considered that each output from a node of a previous layer is multiplied by a corresponding weight and is offset by an offset at the node, so that a corresponding output is finally obtained. Because the input and output are represented in a form of a vector or matrix, the corresponding weight may constitute a form of a matrix, referred to as a weight matrix.

An input vector or matrix is multiplied by a weight matrix and may be offset by an offset matrix, to obtain an output vector or matrix.

Excitation matrix: Similarly to the foregoing introduction and discussion of a weight matrix, if an input into a node is represented in a form of a matrix, the input is an excitation matrix. Processing by a node may be considered as multiplication of an excitation matrix and a weight matrix.

Pruning: Determining is performed on a weight element in a weight matrix, and if the weight has little impact on an operation result of a deep learning network, the weight may be excluded from operations, that is, a value of the weight is changed to 0. In this way, operations are performed on only non-zero weights in the weight matrix, thereby reducing computation intensity and memory overheads.

Structured pruning: Structured pruning is pruning through which a weight distribution in a pruned weight matrix presents a fixed pattern. For example, through pruning, values of 50% of weights in each row of a weight matrix are changed to 0, or values of 20% of weights in each column of a weight matrix are changed to 0. Because structured sparsity caused by structured pruning presents a fixed pattern and distribution, structured pruning is quite hardware-friendly.

Sparsity coefficient: A sparsity coefficient is a proportion of non-pruned weights to all weights in a pruned weight matrix, or a proportion of non-pruned weights in each row or column of a pruned weight matrix to all weights in the row or column. For example, a sparsity of 50% indicates that values of half of weights in each row of a weight matrix are changed to 0.

Weight matrix before being sparsified: A weight matrix before being sparsified is a weight matrix on which weight pruning (changing values of some weights to 0) is not performed.

Sparsified weight matrix: A sparsified weight matrix is a weight matrix resulting from weight pruning (changing values of some weights to 0).

Selection index: A selection index is an index for indicating an object of selection, where 1 is usually used to indicate that the object is to be selected for an operation, and 0 is usually used to indicate that the object is not to be selected and is excluded from operations. The object may be a row of a weight matrix, or may be a weight or the like.

Acceleration unit: For a case that a conventional processing unit is not highly efficient in some dedicated fields (for example, image processing, and processing of various operations of a deep learning network), an acceleration unit is a processing unit designed for increasing a data processing speed in these dedicated fields. An acceleration unit is also referred to as an artificial intelligence (AI) processing unit, including a central processing unit (CPU), a graphics processing unit (GPU), a general-purpose graphics processing unit (GPGPU), a field programmable gate array (FPGA), an application-specific integrated circuit (ASIC), and dedicated intelligent acceleration hardware (for example, a neural-network processing unit NPU or a hardware accelerator).

Processing unit: A processing unit is a unit that performs conventional processing (not used for image processing or processing of complex operations such as full-connection operations in various deep learning networks) in a server of a data center. In addition, a processing unit further performs a scheduling function for an acceleration unit and the processing unit itself, and allocates to-be-undertaken tasks to the acceleration unit and the processing unit itself. A plurality of forms of processing units may be used, such as a central processing unit (CPU), an application-specific integrated circuit (ASIC), and a field programmable gate array (FPGA).

Computation unit: A computation unit is a unit that performs DNN inference in the embodiments of this disclosure, and may be a tensor engine, but is not limited to a tensor engine.

Data Center

A data center is a specific device network of global collaboration, and is used to transfer, accelerate, present, calculate, and store data information on network infrastructure of the Internet. In future development, data centers will also become assets for which enterprises contend. As data centers become widely applied, artificial intelligence and the like are increasingly applied to data centers. As an important technology of artificial intelligence, deep learning has been abundantly applied to big data analysis operations of data centers.

In a conventional large data center, a network structure is usually a structure shown in FIG. 1, that is, hierarchical inter-networking model. The model includes the following parts:

Server 140: Each server 140 is a processing and storage entity of the data center. Processing and storage of a large amount of data in the data center are all completed by these servers 140.

Access switch 130: The access switch 130 is adapted to allow the server 140 to access a switch in the data center. One access switch 130 accesses a plurality of servers 140. The access switch 130 is usually located on the top of a rack. Therefore, the access switch 130 is also referred to as a top of rack (Top of Rack) switch, and is physically connected to servers.

Aggregation switch 120: Each aggregation switch 120 is connected to a plurality of access switches 130, and also provides other services, for example, a firewall, intrusion detection, and network analysis.

Core switch 110: The core switch 110 provides high-speed forwarding for packets entering and leaving the data center, and provides connectivity for the aggregation switch 120. A network of the entire data center is divided into an L3 routing network and an L2 routing network. The core switch 110 usually provides an elastic L3 routing network for the network of the entire data center.

Usually, the aggregation switch 120 is a demarcation point between the L2 and L3 routing networks. The L2 network is below the aggregation switch 120, and the L3 network is above the aggregation switch 120. Each aggregation switch manages a point of delivery (POD, Point Of Delivery). There is an independent VLAN in each POD. During server migration in the POD, an IP address and a default gateway do not need to be changed, because one POD corresponds to one L2 broadcast domain.

The spanning tree protocol (STP, Spanning Tree Protocol) is usually used between the aggregation switch 120 and the access switch 130. The STP has the following effect: For one VLAN, only one aggregation switch 120 can be used, and another aggregation switch 120 is used only when a fault occurs. In other words, horizontal expansion cannot be implemented at a layer of the aggregation switch 120, because there is only one aggregation switch 120 working even if a plurality of aggregation switches 120 are added.

In deployment and running of a deep learning network, the to-be-deployed deep learning network may be allocated to one portal server 140 of the data center, so that the portal server 140 allocates deployment instructions of the entire deep learning network to a plurality of different servers 140 for deployment. When the deep learning network is to be run to perform inference, an inference instruction is sent to the portal server 140, so that the portal server 140 allocates, based on an allocation status of the deep learning network on the plurality of servers 140, the inference instruction to a corresponding server 140 for running.

Server

Figure 2:
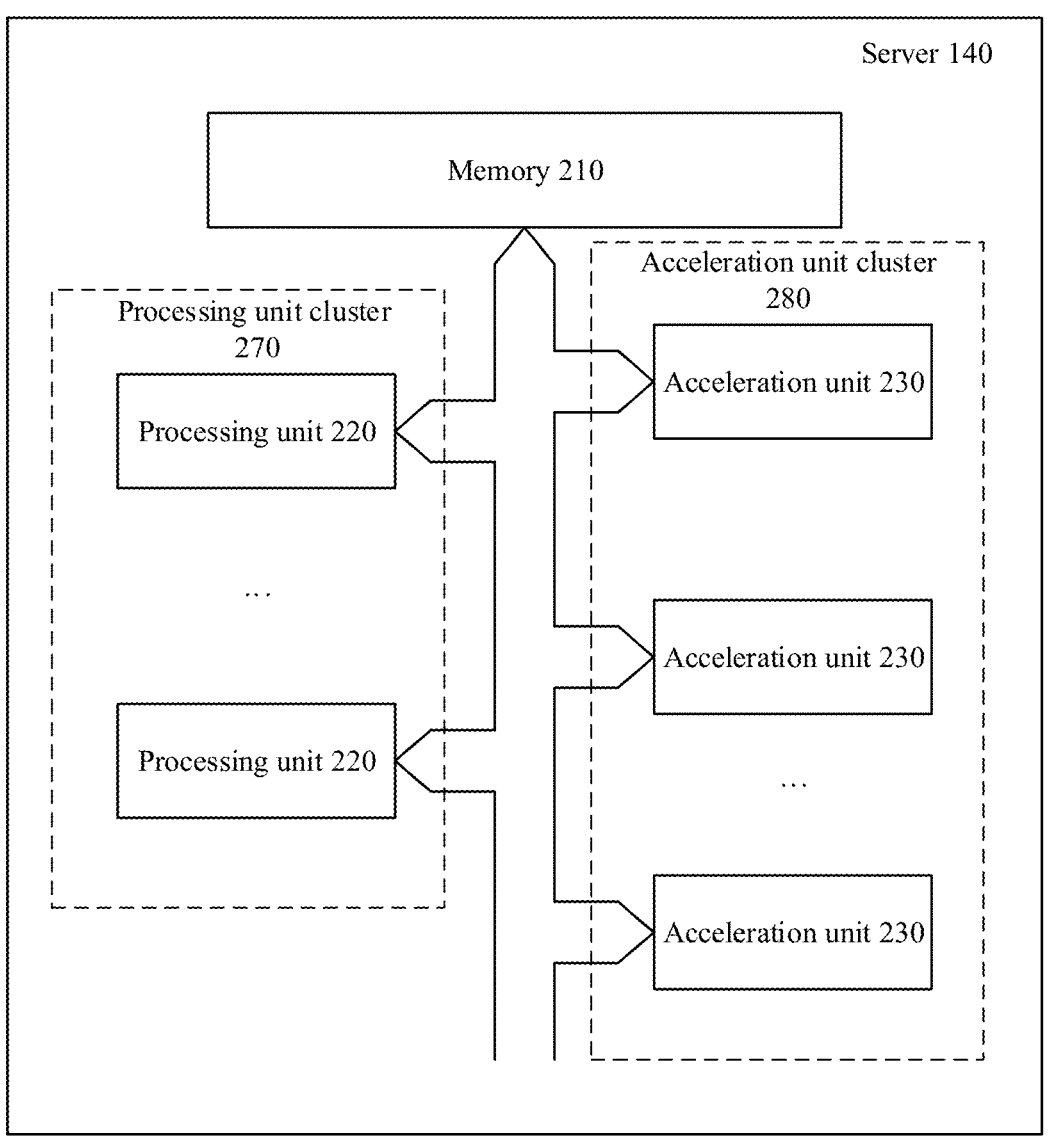
FIG. 2 is a diagram of an internal structure of a server in a data center according to an embodiment of this disclosure.

Because the server 140 is an actual processing device of the data center, FIG. 2 shows a block diagram of an internal structure of the server 140. The server 140 includes a memory 210, a processing unit cluster 270, and an acceleration unit cluster 280 that are connected by using a bus. The processing unit cluster 270 includes a plurality of processing units 220. The acceleration unit cluster 280 includes a plurality of acceleration units 230. The acceleration unit 230 is a processing unit designed for increasing a data processing speed in dedicated fields. The acceleration unit is an artificial intelligence (AI) processing unit, including a central processing unit (CPU), a graphics processing unit (GPU), a general-purpose graphics processing unit (GPGPU), a field programmable gate array (FPGA), an application-specific integrated circuit (ASIC), and dedicated intelligent acceleration hardware (for example, a neural-network processing unit NPU or a hardware accelerator).

In an architecture design of the conventional processing unit 220, a control unit and a storage unit occupy a large proportion of space in an architecture, whereas space occupied by a computing unit is a smaller portion. Therefore, the processing units 220 are very effective in terms of logic control, but are not sufficiently efficient in terms of large-scale parallel computing. For this reason, various dedicated acceleration units 230 are developed to perform more effective processing for increasing operation speeds of computing with different functions and in different fields, for example, increasing an operation speed for a deep learning network. Such an architecture in which the acceleration unit 230 adopts data-driven parallel computing for a deep leaning network is used for a processing unit that processes a large amount of operations (for example, full-connection operations and pooling) of each deep learning network node. Data and intermediate results in a large amount of operations (for example, full-connection operations and pooling) of each deep learning network node are closely associated and frequently used throughout a computing process. Therefore, in the conventional processing unit architecture, because a memory capacity in a processing unit core is relatively small, an extra-core memory needs to be accessed frequently, leading to low processing efficiency. With the acceleration unit dedicated for increasing an operation processing speed of a deep learning network, because each core of the acceleration unit has an on-chip memory with a storage capacity suitable for computing of a deep learning network, frequent access to a memory outside the core is avoided, thereby greatly improving processing efficiency, and improving computing performance.

The acceleration unit 230 needs to be scheduled by the processing unit 220. As shown in FIG. 2, the memory 210 stores apart of various deep learning networks, including weight matrices of some nodes of these models and the like. When needed, the part of these deep learning networks is deployed by one processing unit 220 onto one acceleration unit 230 in FIG. 2. To be specific, the processing unit 220 may send addresses, in the memory 210, of some parameters (such as a weight matrix of each node) in the deep learning network to the acceleration unit 230 in a form of an instruction. When actually performing computing by using the deep leaning network, the acceleration unit 230 directly addresses these parameters in the memory 210 based on the addresses of these parameters (for example, the weight matrix) in the memory 210, and temporarily stores these parameters in an on-chip memory of the acceleration unit 230. When the acceleration unit 230 actually performs computing by using the deep learning network, the processing unit 220 further sends an excitation matrix of the model to the acceleration unit 230 in a form of an instruction, and the excitation matrix is temporarily stored in the on-chip memory of the acceleration unit 230. Then, the acceleration unit 230 may perform inference computing based on these input excitation matrices and the weight matrices in the model.

Internal Structures of the Processing Unit and the Acceleration Unit

Figure 3:
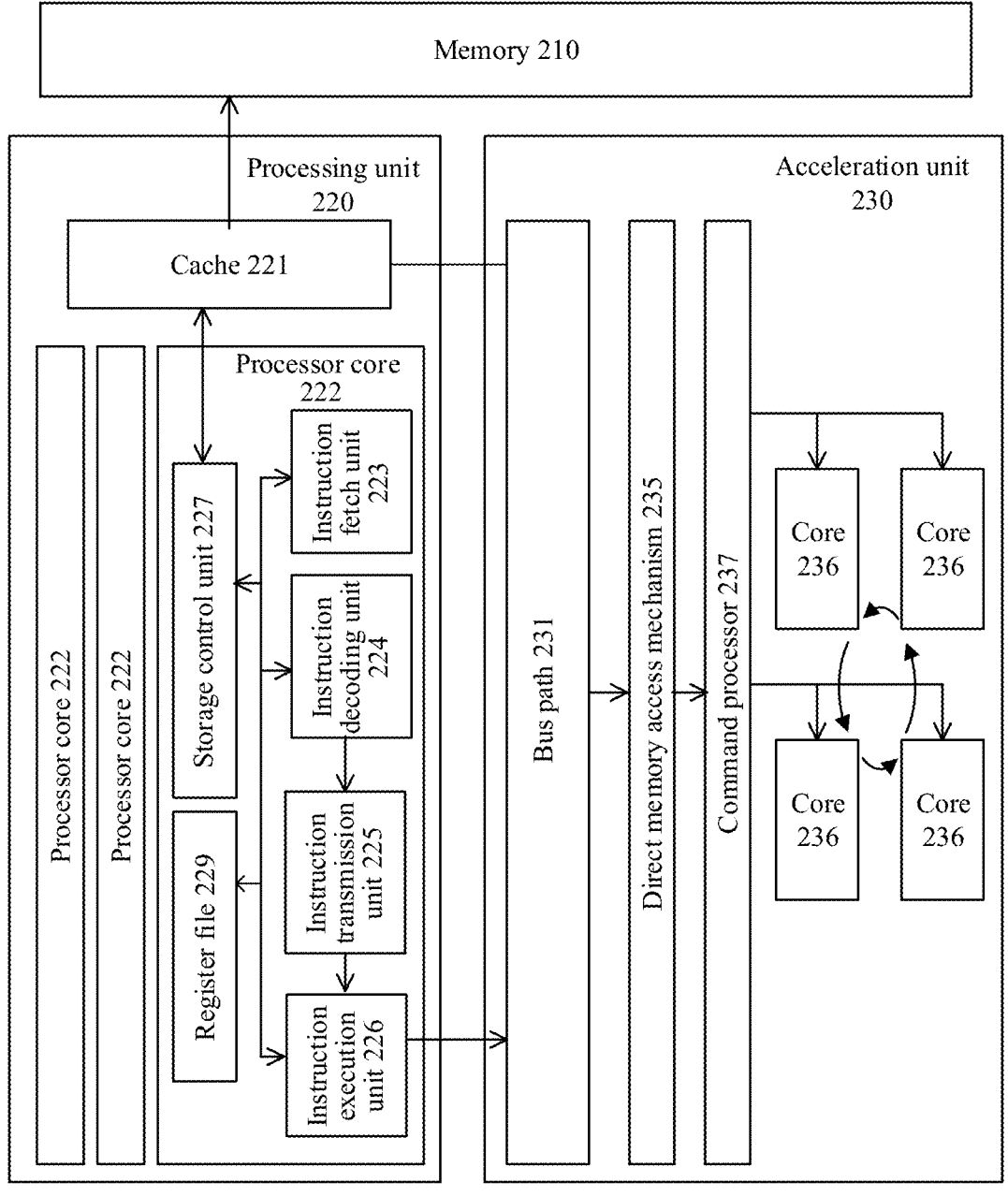
FIG. 3 is a diagram of internal structures of a processing unit and an acceleration unit in a server according to an embodiment of this disclosure.

The following specifically describes how the processing unit 220 schedules the acceleration unit 230 and the processing unit 220 itself for working, with reference to a diagram of internal structures of the processing unit 220 and the acceleration unit 230 in FIG. 3.

As shown in FIG. 3, the processing unit 220 includes a plurality of processor cores 222 and a cache 221 shared by the plurality of processor cores 222. Each processor core 222 includes an instruction fetch unit 223, an instruction decoding unit 224, an instruction transmission unit 225, and an instruction execution unit 226.

The instruction fetch unit 223 is adapted to move a to-be-executed instruction from the memory 210 to an instruction register (which may be a register that is used for instruction storage and that is in a register file 229 shown in FIG. 3), and receive a next instruction fetch address, or obtain a next instruction fetch address through computing based on an instruction fetch algorithm, where the instruction fetch algorithm includes, for example, address increment or address decrement based on an instruction length.

After the instruction is fetched, the processing unit 220 enters an instruction decoding phase, and the instruction decoding unit 224 decodes the fetched instruction in a predetermined instruction format, to obtain operand acquisition information required for the fetched instruction, thereby making preparation for an operation of the instruction execution unit 226. The operand acquisition information indicates, for example, an immediate, a register, or other software/hardware capable of providing a source operand.

The instruction transmission unit 225 is located between the instruction decoding unit 224 and the instruction execution unit 226, and is used for instruction scheduling and control, to efficiently allocate instructions to different instruction execution units 226, so that parallel operation of a plurality of instructions is made possible.

After the instruction transmission unit 225 transmits the instruction to the instruction execution unit 226, the instruction execution unit 226 starts to execute the instruction. However, if the instruction execution unit 226 determines that the instruction is to be executed by an acceleration unit, the instruction execution unit 226 forwards the instruction to the corresponding acceleration unit for execution. For example, if the processing unit 220 has deployed an operation related to the instruction, such as a deep learning network inference instruction, onto the acceleration unit 230 for execution, the instruction execution unit 226 no longer executes the instruction, but sends the instruction to the acceleration unit 230 by using a bus, so that the acceleration unit 230 executes the instruction.

The acceleration unit 230 includes a plurality of cores 236 (although four cores are shown in FIG. 3, a person skilled in the art should understand that the acceleration unit 230 may alternatively include another number of cores 236), a command processor 237, a direct memory access mechanism 235, and a bus path 231.

The bus path 231 is a path along which instructions enter and leave the acceleration unit 230 through the bus.

The direct memory access (DMA, Direct Memory Access) mechanism 235 is a function provided by some computer bus architectures, and can enable data to be directly written into a memory of a computer mainboard from an attached device. Compared with a manner in which all data transmission between devices needs to go through a processing unit, this manner greatly improves data access efficiency. Due to such a mechanism, the cores of the acceleration unit 230 can directly access the memory 210 to read parameters (for example, a weight matrix of each node) in a deep learning network and the like, so that data access efficiency is greatly improved.

The command processor 237 allocates, to a core 236 for execution, the instruction sent by the processing unit 220 to the acceleration unit 230. The instruction execution unit 226 sends, to the acceleration unit 230, a to-be-executed instruction sequence that needs to be executed by the acceleration unit 230. After entering the acceleration unit 230 through the bus path 231, the to-be-executed instruction sequence is buffered in the command processor 237, and the command processor 237 selects a core 236 to allocate the instruction sequence to the selected core 236 for execution. In addition, the command processor 237 is further responsible for a synchronization operation between the cores 236.

In this embodiment of this disclosure, when the instruction fetch unit 223 fetches an instruction from the memory 210, and it is found, through decoding of the instruction decoding unit 224, that the instruction is a deep learning network deployment instruction, the instruction is sent to the instruction execution unit 226; the instruction execution unit 226 deploys the deployment instruction onto the acceleration unit 230, that is, sends addresses, in the memory 210, of parameters (such as a weight matrix of each node) in this part of deep learning networks to the acceleration unit 230 in a form of an instruction; and the acceleration unit 230 temporarily stores the addresses in the on-chip memory of the acceleration unit 230.

In this embodiment of this disclosure, when the instruction fetch unit 223 fetches an instruction from the memory 210, and it is found, through decoding of the instruction decoding unit 224, that the instruction is an actual inference instruction of a deep learning network, an excitation matrix used as an input into the deep learning network is sent to the acceleration unit 230 in a form of an instruction, and is temporarily stored in the on-chip memory of the acceleration unit 230. Then, the acceleration unit 230 may perform operations based on these input excitation matrices and the parameters (for example, weight matrices) found based on the addresses of the parameters (for example, weight matrices) temporarily stored in the on-chip memory, to obtain inference results.

Acceleration Unit Core

Figure 4:
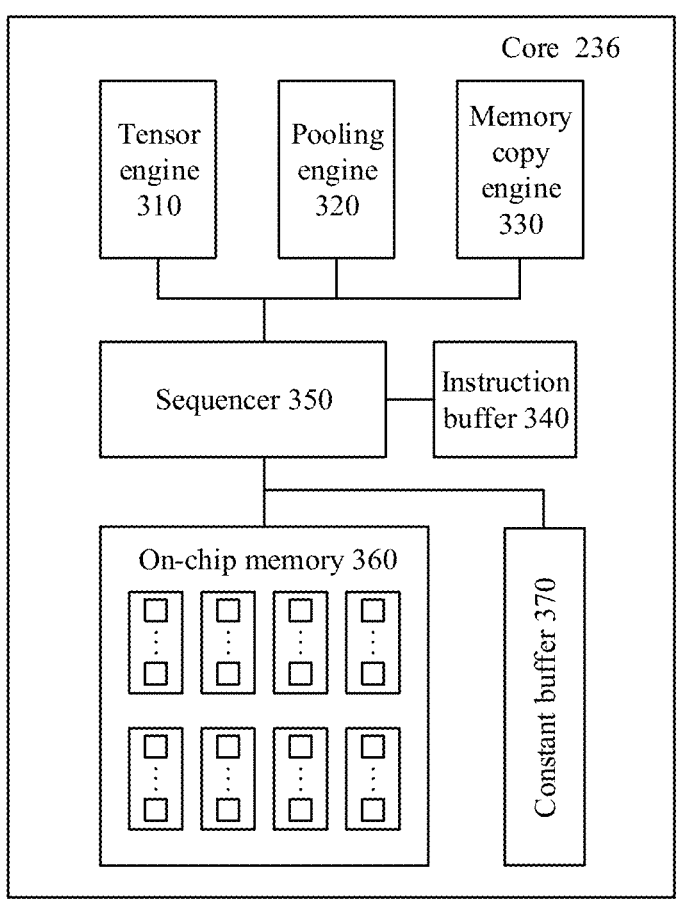
FIG. 4 is a diagram of an internal structure of an acceleration unit core according to an embodiment of this disclosure.

FIG. 4 is a diagram of an internal structure of an acceleration unit core according to an embodiment of this disclosure.

In an embodiment, as shown in FIG. 4, the acceleration unit core 236 includes a tensor engine 310, a pooling engine 320, a memory copy engine 330, a sequencer 350, an instruction buffer 340, an on-chip memory 360, and a constant buffer 370.

An instruction sequence allocated by the command processor 237 to the acceleration unit core 236 is first buffered in the instruction buffer 340. Then, the sequencer 350 fetches instructions from the instruction buffer 340 in a first-in-first-out order, and allocates, based on properties of the instructions, the instructions to the tensor engine 310 or the pooling engine 320 for execution. The tensor engine 310 is responsible for processing related operations such as convolution, array multiplication, and a full-connection operation in a deep learning network. The embodiments of this disclosure are mainly performed by the tensor engine 310. The pooling engine 320 is responsible for processing a pooling operation in a deep learning network. The memory copy engine 330 is a unit dedicated for processing data copy. The data copy herein includes copying some data from the on-chip memory 360 to a memory shared by all the cores 236 or an on-chip memory 360 of another core 236 because the on-chip memory 360 may overflow. The sequencer 350 determines, based on whether an operation property of a fetched instruction is convolution, array multiplication, a full-connection operation, pooling, data copy, or the like, to allocate the instruction to the tensor engine 310, the pooling engine 320, or the memory copy engine 330.

The on-chip memory 360 is an intra-core memory that stores weight matrices in a deep learning network and excitation matrices and various intermediate results that are input during actual use of the deep learning network. The constant buffer 370 is a buffer that stores constant parameters (for example, hyperparameters in a neural network model) other than weight matrices in a deep learning network. As described above, in a process in which the processing unit 220 preconfigures a deep learning network on the acceleration unit 230, the processing unit 220 sends addresses, in the memory 210, of parameters in the deep learning network to the acceleration unit 230 in a form of an instruction. These parameters include weight matrices of nodes and other parameters (for example, hyperparameters). For a weight matrix, during actual deep learning network inference, the acceleration unit 230 fetches the weight matrix from a corresponding location in the memory 210, and places the weight matrix into the on-chip memory 360. For another parameter, during actual deep learning network inference, the acceleration unit 230 fetches the parameter from a corresponding location in the memory 210, and places the parameter into the constant buffer 370. In addition, after an instruction for actually starting inference is allocated by the command processor 237 to the core 236 for execution, an excitation matrix (an input into a deep learning network) in the instruction is also stored in the on-chip memory 360. In addition, various intermediate results obtained through convolution, full-connection, or pooling operations performed by the tensor engine 310 and the pooling engine 320 are also stored in the on-chip memory 360.

Overview of this Disclosure

As described above, to reduce computation intensity and memory overheads of DNNs during DNN deployment and running for inference, prior research has proposed network pruning techniques, that is, changing values of a large number of nodes in a weight matrix of a node to 0, so as to increase sparsity of the weight matrix. No operation needs to be performed on zero-valued weights. In this way, computation intensity and memory overheads are reduced. Particularly, in a weight matrix obtained through structured pruning, values of a fixed proportion of weights are changed to 0, which is quite hardware-friendly. Theoretically, this feature may be used to reduce an amount of computation in hardware when a DNN is deployed on hardware.

However, in actuality, when a DNN is deployed on hardware for execution, two other manners are mainly used currently. One manner is implementing a DNN by using a conventional tensor engine or core dedicated for dense DNN inference. The other manner is a weight-reuse-based tensor engine design manner. Before the embodiments of this disclosure are discussed in detail, these two solutions need to be discussed for better understanding of the embodiments of this disclosure.

Dense DNN Inference Solution

Figure 5A:
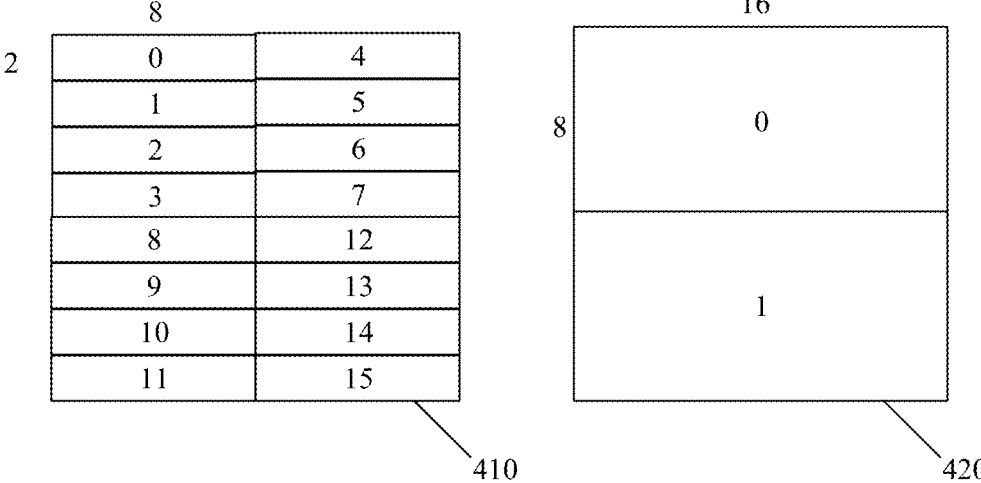
FIG. 5A shows an example of slicing solutions of an excitation matrix and a weight matrix in a tensor engine for dense DNN inference.
Figure 5B:
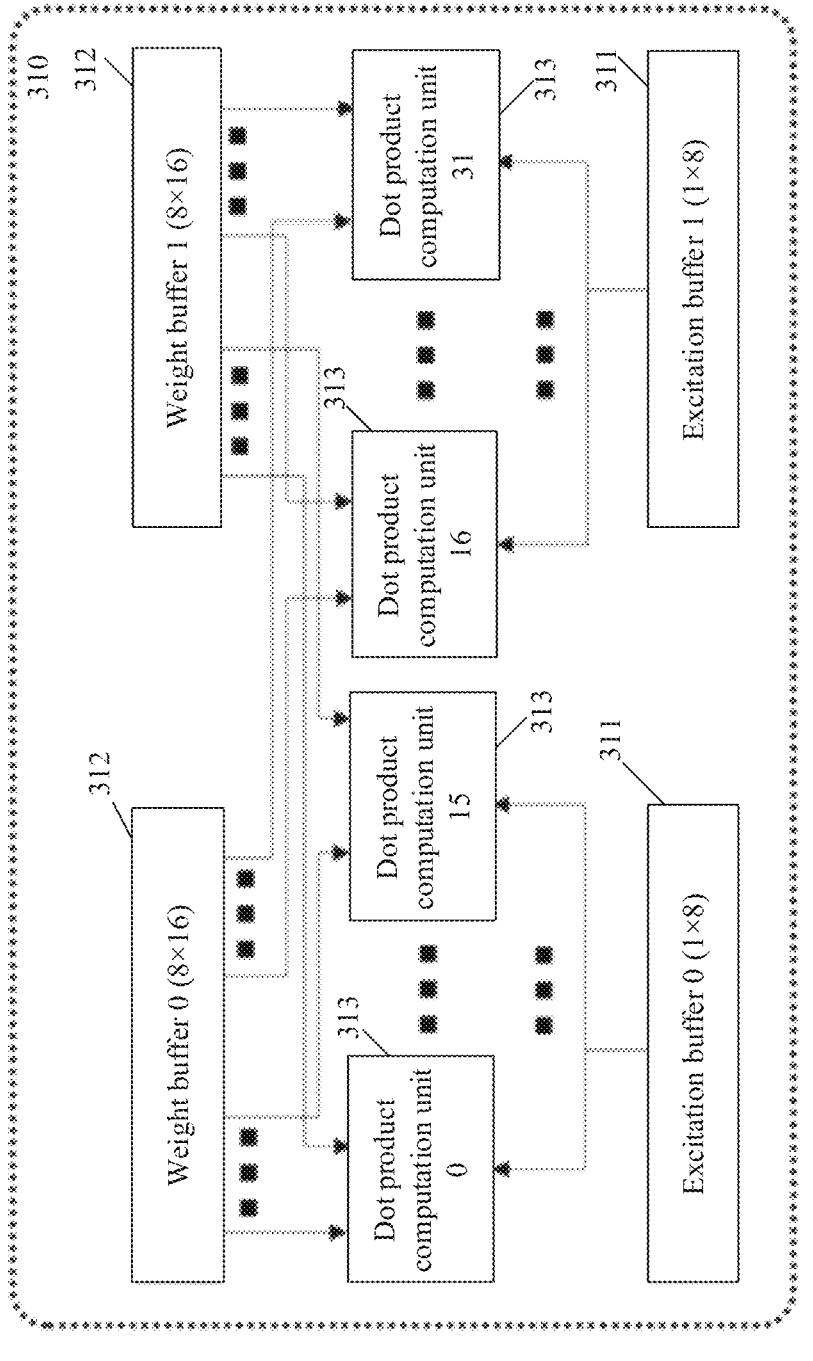
FIG. 5B shows an example of an internal structure of a tensor engine for dense DNN inference.

FIG. 5A shows an example of slicing solutions of an excitation matrix 410 and a weight matrix 420 in a tensor engine 310 for dense DNN inference. FIG. 5B is a structural diagram of the tensor engine 310 for dense DNN inference. As shown in FIG. 5B, the tensor engine 310 for dense DNN inference includes a weight buffer 312, an excitation buffer 311, and a dot product computation unit 313.

The weight buffer 312 is adapted to buffer a weight transferred from the on-chip memory 360 in FIG. 4 to the tensor engine 310. In a process in which the processing unit 220 preconfigures a deep learning network on the acceleration unit 230, the processing unit 220 sends addresses, in the memory 210, of parameters such as weight matrices to the acceleration unit 230 in a form of an instruction. During actual deep learning network inference, the acceleration unit 230 fetches the weight matrices from corresponding locations in the memory 210 based on these addresses, and places the weight matrices into the on-chip memory 360. When weights are required in a running process of the tensor engine 310, the required weights in a weight matrix are placed into the weight buffer 312 for buffering, so that the dot product computation unit 313 uses these weights to perform an operation.

The excitation buffer 311 is adapted to buffer an excitation matrix transferred from the on-chip memory 360 to the tensor engine 310. After an instruction for actually starting inference is allocated by the command processor 237 to a core 236 for execution, an excitation matrix in the instruction is stored in the on-chip memory 360. In addition, when the tensor engine 310 starts to perform an operation, corresponding excitations in the excitation matrix are transferred to the excitation buffer 311 for buffering, so that the dot product computation unit 313 uses these excitations and the weights in the weight buffer 312 to perform a multiplication operation.

Because the excitation matrix and the weight matrix are excessively large, an operation of multiplying the two entire matrices requires excessively high storage and computation overheads. Therefore, a manner of slicing the excitation matrix and the weight matrix is used. During multiplication of the excitation matrix and the weight matrix, each of the excitation matrix and the weight matrix is sliced, and a number of columns of an excitation matrix slice should be equal to a number of rows of a weight matrix slice, to ensure correct multiplication of the matrix slices. As shown in FIG. 5A, a 16×16 excitation matrix 410 may be divided into 16 2×8 excitation matrix slices, and a 16×16 weight matrix 420 may be divided into two 8×16 weight matrix slices. In this way, a number of columns of the excitation matrix slice and a number of rows of the weight matrix slice are both 8, so that the excitation matrix slice can be multiplied by the weight matrix slice, to obtain a 2×16 result matrix slice. Result matrix slices obtained by multiplying all obtained excitation matrix slices by corresponding weight matrix slices are combined, to obtain a final result matrix.

When each 2×8 excitation matrix slice enters the tensor engine 310, the excitation matrix slice is divided into two rows (that is, two 1×8 row vectors), respectively entering excitation buffers 0 and 1 in FIG. 5B. The two 8×16 weight matrix slices respectively enter weight buffers 0 and 1 in FIG. 5B. The weight buffers 0 and 1 are ping-pong buffers, and work alternately. There is only one buffer working at one moment. Row vectors stored in the excitation buffers 0 and 1 are all multiplied by an 8×16 weight matrix slice in the weight buffer 0 or are all multiplied by an 8×16 weight matrix slice in the weight buffer 1, and cannot be multiplied by each of the two weight matrix slices. For example, both of two row vectors into which an excitation matrix slice 0 in FIG. 5A is divided can be multiplied by only a weight matrix slice 0, because according to a matrix multiplication rule, the row vectors can be multiplied by only the weight matrix slice 0 during multiplication of the excitation matrix and the weight matrix. When a row vector stored in the excitation buffer 0 or 1 is multiplied by an 8×16 weight matrix slice stored in the weight buffer 0 or 1, the 8×16 weight matrix slice is divided into 16 columns, and then the 1×8 row vector stored in the excitation buffer 0 or 1 is multiplied by all the obtained columns (that is, all 8×1 column vectors) by using 16 dot product computation units 313 respectively. Each dot product computation unit 313 completes multiplication for each column, and multiplication results for all the columns are combined to obtain a multiplication result of the row vectors stored in the excitation buffer 0 or 1 and the 8×16 weight matrix slice stored in the weight buffer 0 or 1, that is, a multiplication result of the 2×8 excitation matrix slice and the 8×16 weight matrix slice.

Figure 5C:
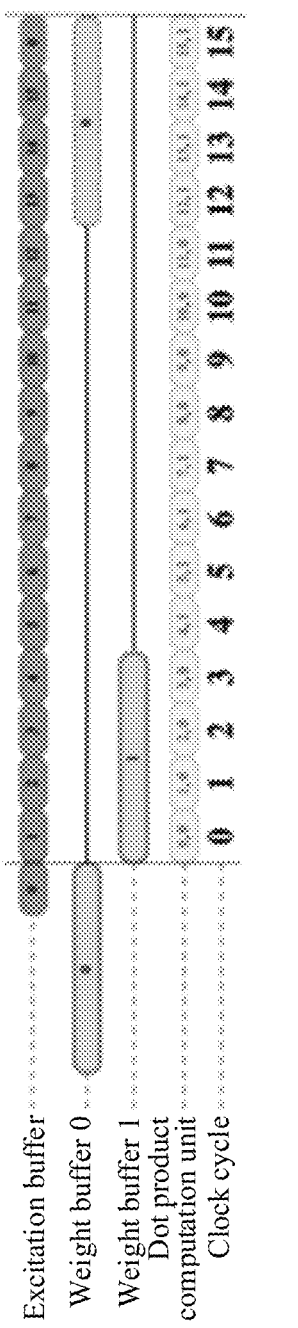
FIG. 5C shows an example of a running time sequence of units in FIG. 5B.

FIG. 5C is a diagram of a running time sequence of a structure of the tensor engine 310 shown in FIG. 5B. Because the excitation matrix is divided into 16 excitation matrix slices, and each excitation matrix slice needs to be multiplied by a corresponding weight matrix slice to obtain a final multiplication result, entire matrix multiplication is divided into 16 clock cycles. Different excitation matrix slices 0 to 15 are loaded to the excitation buffer 311 in clock cycles 0 to 15 respectively. A corresponding excitation matrix slice needs to be loaded to the excitation buffer 311 at least one clock cycle before the dot product computation unit 313 performs an operation on the excitation matrix slice, to ensure that the dot product computation unit 313 can obtain the corresponding excitation matrix slice when performing the operation. The weight buffer 312 does not need to load a weight in each clock cycle, because weights loaded at one time can be repetitively used. For example, according to a multiplication rule of an excitation matrix and a weight matrix, each of excitation matrix slices 0 to 3 in FIG. 5A needs to be multiplied by a weight matrix slice 0; therefore, the weight matrix slice 0 may be loaded to the weight buffer 0 at least four clock cycles before the dot product computation unit 313 needs to use the weight matrix slice 0, and be retained for at least four clock cycles. In this case, the dot product computation unit 313 performs multiplication operations on the excitation matrix slices 0 to 3 and the weight matrix slice 0 in clock cycles 0 to 3 respectively. According to a multiplication rule of an excitation matrix and a weight matrix, each of excitation matrix slices 4 to 7 in FIG. 5A needs to be multiplied by a weight matrix slice 1; therefore, the weight matrix slice 1 may be loaded to the weight buffer 1 at least four clock cycles before the dot product computation unit 313 needs to use the weight matrix slice 1, and be retained for at least four clock cycles. In this case, the dot product computation unit 313 performs multiplication operations on the excitation matrix slices 4 to 7 and the weight matrix slice 1 in clock cycles 4 to 7 respectively.

In the example in FIG. 5B, a requirement on a storage capacity of the excitation buffer 311 is that at least 2×8 pieces of weight data can be contained. Due to a ping-pong buffer mechanism, a requirement on a storage capacity of the weight buffer 312 is that at least (8×16)×2 pieces of weight data can be contained. Each piece of weight data occupies 16 bits. Therefore, an excitation-induced bandwidth requirement is (2×8)×16=256 bits/clock cycle, and a weight-induced bandwidth requirement is (8×16/4)×16=512 bits/clock cycle, where a reason for division by 4 is that the weight buffer 312 does not need to update data in each clock cycle and may update data once in four clock cycles, as shown in FIG. 5C.

A disadvantage of the dense DNN inference solution is that structured sparsity of a DNN cannot be fully utilized. Values of many weights are changed to 0 in a pruned weight matrix, but these weights still need to be used in an operation performed by the dot product computation unit 313. Therefore, no saving is achieved, and bandwidth occupation and computing resource consumption are relatively high.

Weight-Reuse-Based Sparse DNN Inference Solution

Figure 6A:
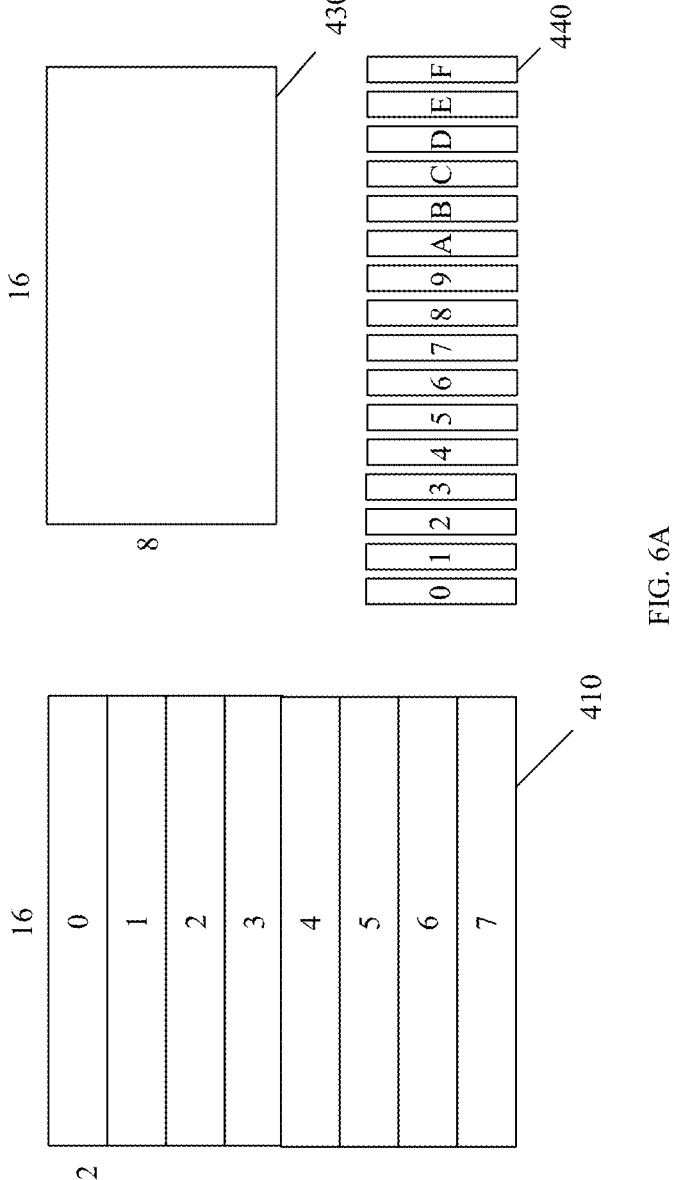
FIG. 6A shows an example of slicing solutions of an excitation matrix and a weight matrix in a tensor engine for weight-reuse-based sparse DNN inference.
Figure 6B:
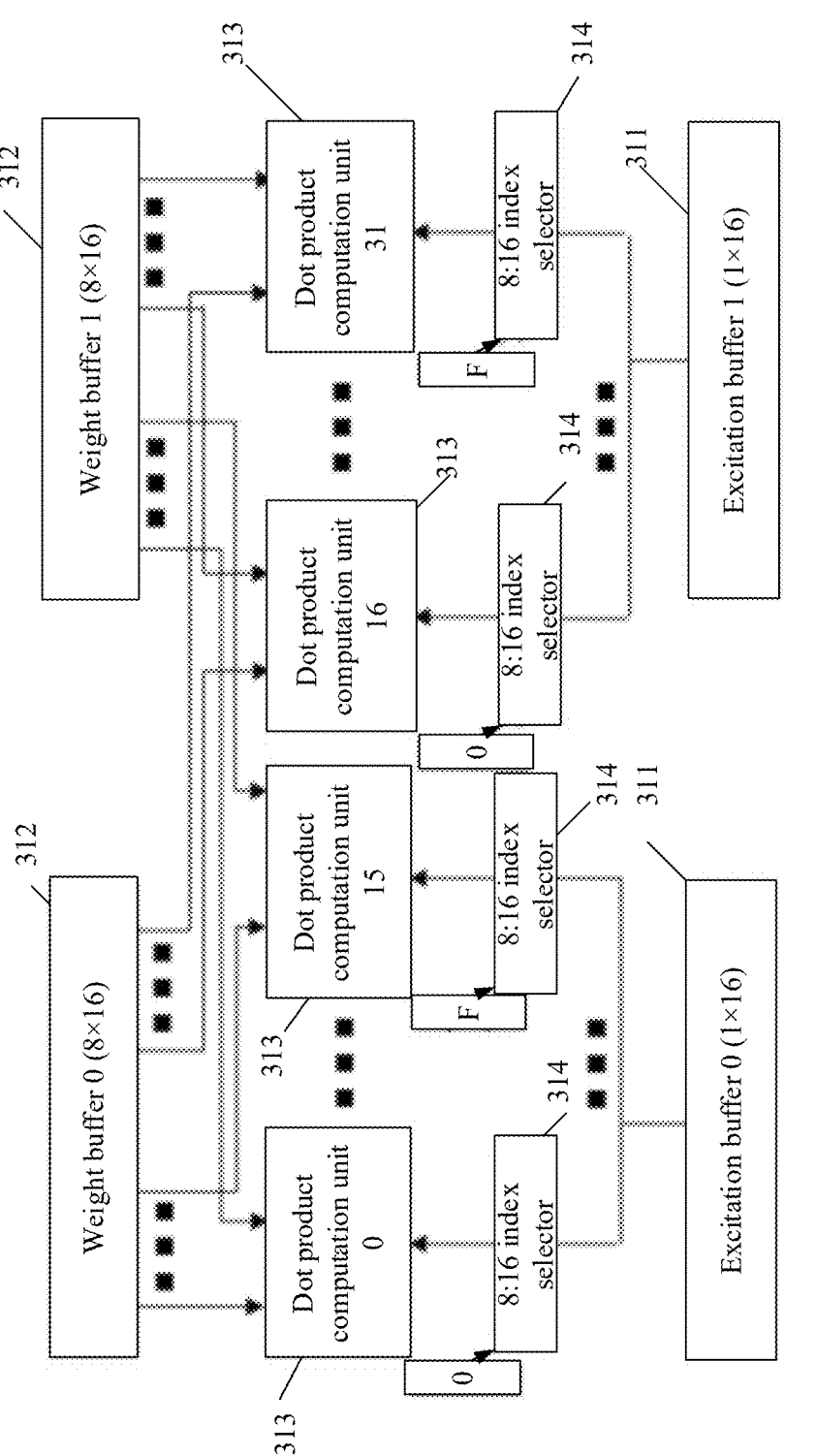
FIG. 6B shows an example of an internal structure of a tensor engine for weight-reuse-based sparse DNN inference.

FIG. 6A shows an example of slicing solutions of an excitation matrix and a weight matrix in a tensor engine 310 for weight-reuse-based sparse DNN inference. FIG. 6B is a structural diagram of the tensor engine 310 for weight-reuse-based sparse DNN inference. As shown in FIG. 6B, the tensor engine 310 for weight-reuse-based sparse DNN inference includes a weight buffer 312, an excitation buffer 311, an index selector 314, and a dot product computation unit 313.

The weight buffer 312 is adapted to buffer a weight in a sparsified weight matrix transferred from the on-chip memory 360 in FIG. 4 to the tensor engine 310. Values of weights pruned from a weight matrix are changed to 0, and these weights are excluded from operations performed by the dot product computation unit 313. Therefore, bandwidth and computing resources are saved. Therefore, the weight buffer 312 needs to buffer only a weight that is not pruned from a weight matrix. In a process in which the processing unit 220 preconfigures a deep learning network on the acceleration unit 230, the processing unit 220 sends addresses, in the memory 210, of sparsified weight matrices to the acceleration unit 230 in a form of an instruction. During actual deep learning network inference, the acceleration unit 230 fetches the sparsified weight matrices from corresponding locations in the memory 210 based on these addresses, and places the sparsified weight matrices into the on-chip memory 360. When weights are required in a running process of the tensor engine 310, the required weights in a sparsified weight matrix are placed into the weight buffer 312 for buffering, so that the dot product computation unit 313 uses these weights to perform an operation.

The excitation buffer 311 is adapted to buffer an excitation transferred from the on-chip memory 360 to the tensor engine 310. After an instruction for actually starting inference is allocated by the command processor 237 to a core 236 for execution, an excitation matrix in the instruction is stored in the on-chip memory 360. In addition, when the tensor engine 310 starts to perform an operation, corresponding excitations in the excitation matrix are transferred to the excitation buffer 311 for buffering, so that the dot product computation unit 313 uses these excitations and the weights in the weight buffer 312 to perform a multiplication operation. The weight buffer 312 stores a weight in a sparsified weight matrix, and the excitation buffer 311 stores excitation rows of an entire excitation matrix. In these excitation rows, not every excitation element is used in an operation performed by the dot product computation unit 313. Only excitation elements corresponding to weights that are not pruned away are input into the dot product computation unit 313 for an operation. Therefore, the index selector 314 is disposed between the excitation buffer 311 and the dot product computation unit 313, to select, based on a stored selection index, an excitation element that is in an excitation row and that corresponds to a weight that is not pruned away. In an example, a selection index corresponding to a weight that is not pruned away may be set to 1, and a selection index corresponding to a pruned weight may be set to 0.

Because the excitation matrix is excessively large, multiplying the excitation matrix by the weight matrix requires excessively high storage and computation overheads. Therefore, a manner of slicing the excitation matrix is used. As shown in FIG. 6A, a 16×16 excitation matrix may be divided into eight 2×16 excitation matrix slices. Assuming that a sparsity coefficient is 50%, a 16×16 weight matrix is changed into an 8×16 sparsified weight matrix through pruning. Because the number of columns of the excitation matrix slice is 16, and the number of rows of the sparsified weight matrix is 8, the excitation matrix slice cannot be directly multiplied by the sparsified weight matrix. However, because 50% of weights in the weight matrix are pruned away with values changed to 0, and do not need to be multiplied by corresponding excitations, only half of 16 columns, that is, eight columns, of the excitation matrix slice actually need to be multiplied by the sparsified weight matrix. The sparsified weight matrix has eight rows, and therefore can be multiplied by the excitation matrix slice. When the 2×16 excitation matrix slice enters the tensor engine 310, the excitation matrix slice is divided into two rows (that is, two 1×16 row vectors), respectively entering excitation buffers 0 and 1 in FIG. 6B. In the row vector with 16 excitation elements, only eight excitation elements need to be multiplied by the 8×16 sparsified excitation matrix. Therefore, through selection by an 8:16 index selector 314, only eight excitation elements can enter a corresponding dot product computation unit 313, to be multiplied by a corresponding column in the 16 columns of the 8×16 sparsified excitation matrix. Which eight excitation elements in the 16 excitation elements of the row vector are to be selected is determined by a selection index that corresponds to the row vector and that is stored in the index selector 314. Different row vectors correspond to different selection indexes, indicating different to-be-selected excitation elements.

The 8×16 sparsified weight matrix enters the weight buffer 0 in FIG. 6B, and a next 8×16 sparsified weight matrix enters the weight buffer 1 in FIG. 6B. The weight buffers 0 and 1 are ping-pong buffers. The weight buffer 1 is allowed to work only after all operations related to the sparsified weight matrix stored in the weight buffer 0 are completed. There is only one weight buffer working at one moment. Through selection by the index selector 314, the 1×16 row vector stored in the excitation buffer 311 is actually changed into a 1×8 row vector, so that the row vector can be multiplied by the 8×16 sparsified excitation matrix stored in the weight buffer 0. Each dot product computation unit 313 completes multiplication of the 1×8 row vector and each column vector in the 8×16 sparsified excitation matrix, and multiplication results for all column vectors are combined to obtain a multiplication result of the row vector and the entire 8×16 sparsified excitation matrix stored in the weight buffer 0.

Figure 6C:
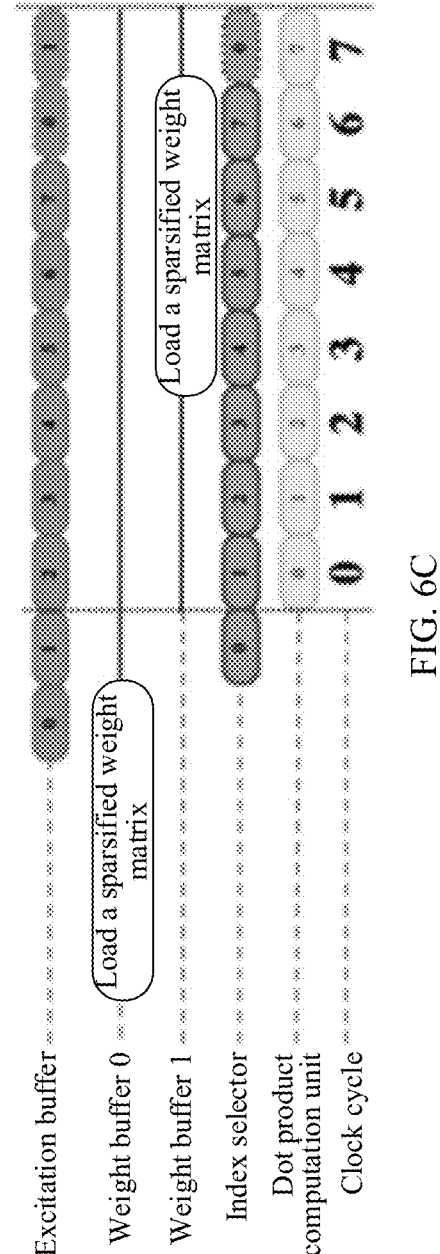
FIG. 6C shows an example of a running time sequence of units in FIG. 6B.

FIG. 6C is a diagram of a running time sequence of a structure of the tensor engine 310 shown in FIG. 6B.

Because the excitation matrix is divided into eight excitation matrix slices, and each excitation matrix slice needs to be multiplied by the sparsified weight matrix to obtain a final multiplication result, entire matrix multiplication is divided into eight clock cycles. Different selection indexes need to be loaded to the index selector 314 in clock cycles 0 to 7 respectively. A corresponding selection index needs to be loaded to the index selector 314 at least one clock cycle before the dot product computation unit 313 performs an operation on an excitation matrix slice, to ensure that the dot product computation unit 313 can select a 1×8 row vector based on the selection index when performing the operation, so as to multiply the row vector by each column vector in the 8×16 sparsified excitation matrix. Different excitation matrix slices 0 to 7 are loaded to the excitation buffer 311 in the clock cycles 0 to 7 respectively. A corresponding excitation matrix slice needs to be loaded to the excitation buffer 311 one clock cycle before the index selector 314 completes corresponding selection, to ensure that the index selector 314 can perform selection on the excitation matrix slice in a timely manner without delaying an operation of the dot product computation unit 313. The weight buffer 312 does not need to load a weight in each clock cycle, because weights loaded at one time can be repetitively used. A sparsified excitation matrix may be loaded to the weight buffer 0 at one time, and then, the dot product computation unit 313 uses the sparsified excitation matrix in each of the clock cycles 0 to 7; therefore, the sparsified matrix may be loaded eight clock cycles before the index selector 314 performs selection based on a selection index. In FIG. 6C, loading is performed four clock cycles before the index selector 314 performs selection based on a selection index. This is not limited, provided that loading can be performed before the index selector 314 performs selection.

In the example in FIG. 6B, a requirement on a storage capacity of the excitation buffer 311 is that at least 2×16 pieces of weight data can be contained. Due to a ping-pong buffer mechanism, a requirement on a storage capacity of the weight buffer 312 is that at least (8×16)×2 pieces of weight data can be contained. Each piece of weight data occupies 16 bits. Therefore, an excitation-induced bandwidth requirement is (2×16)×16=512 bits/clock cycle, and a weight-induced bandwidth requirement is (8×16/4+number of selection index bytes)×16, a result of which is approximately equal to 512 bits/clock cycle because the number of selection index bytes is ignorable. A reason for division by 4 is that the weight buffer 312 does not need to update data in each clock cycle and may update data once in four clock cycles, as shown in FIG. 6C.

A disadvantage of the weight-reuse-based sparse DNN inference solution is that, because a ping-pong buffer design is used for the weight buffer, a relatively strict time sequence is required, and a register file requires relatively high bandwidth.

Excitation-Reuse-Based Sparse DNN Inference Solution According to an Embodiment of this Disclosure Excitation-reuse-based sparse DNN inference according to this embodiment of this disclosure is performed by a computation unit. The computation unit may be the tensor engine 310, but is not limited to the tensor engine 310. The tensor engine 310 is used as an example below. FIG. 8B is a structural diagram of the tensor engine 310 for excitation-reuse-based sparse DNN inference according to an embodiment of this disclosure. As shown in FIG. 8B, the tensor engine 310 for excitation-reuse-based sparse DNN inference includes a weight buffer 312, an excitation buffer 311, an index selector 314, and a dot product computation unit 313.

Figure 7A:
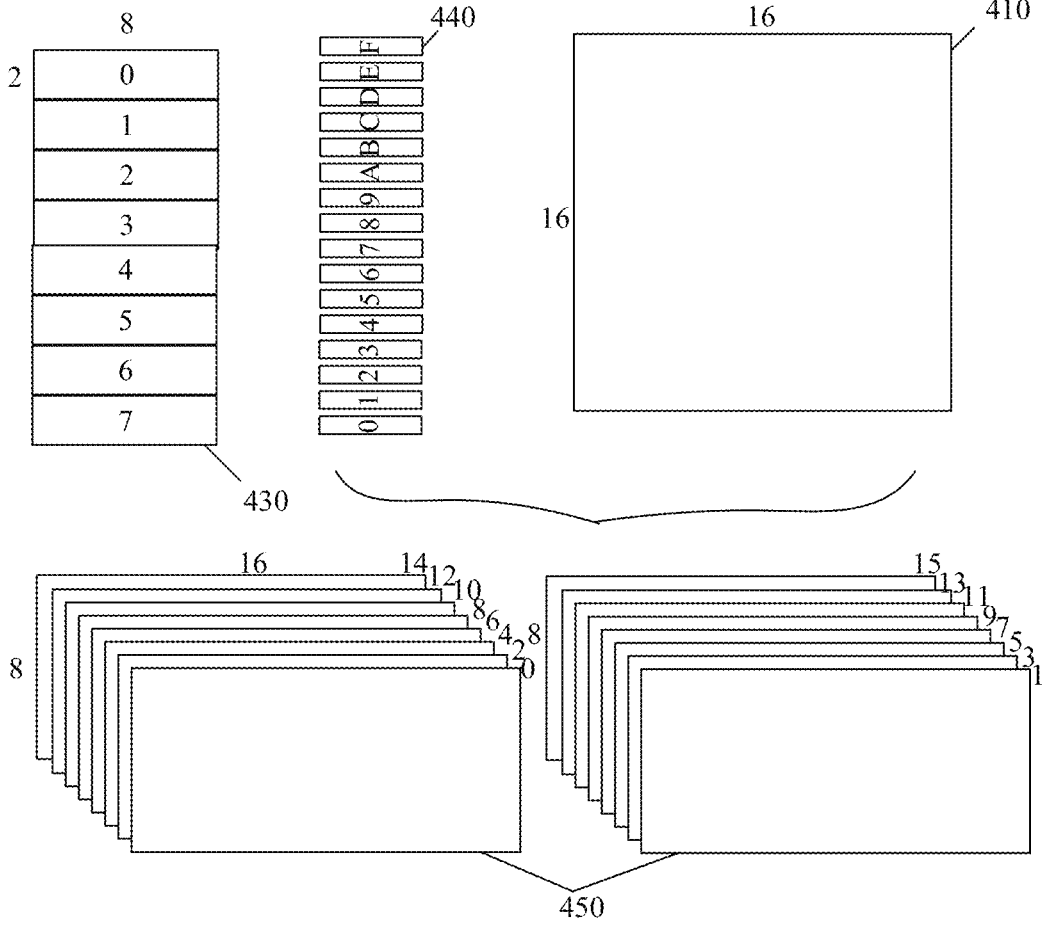
FIG. 7A shows an example of slicing solutions of an excitation matrix and a weight matrix in a tensor engine for excitation-reuse-based sparse DNN inference according to an embodiment of this disclosure.
Figure 8A:
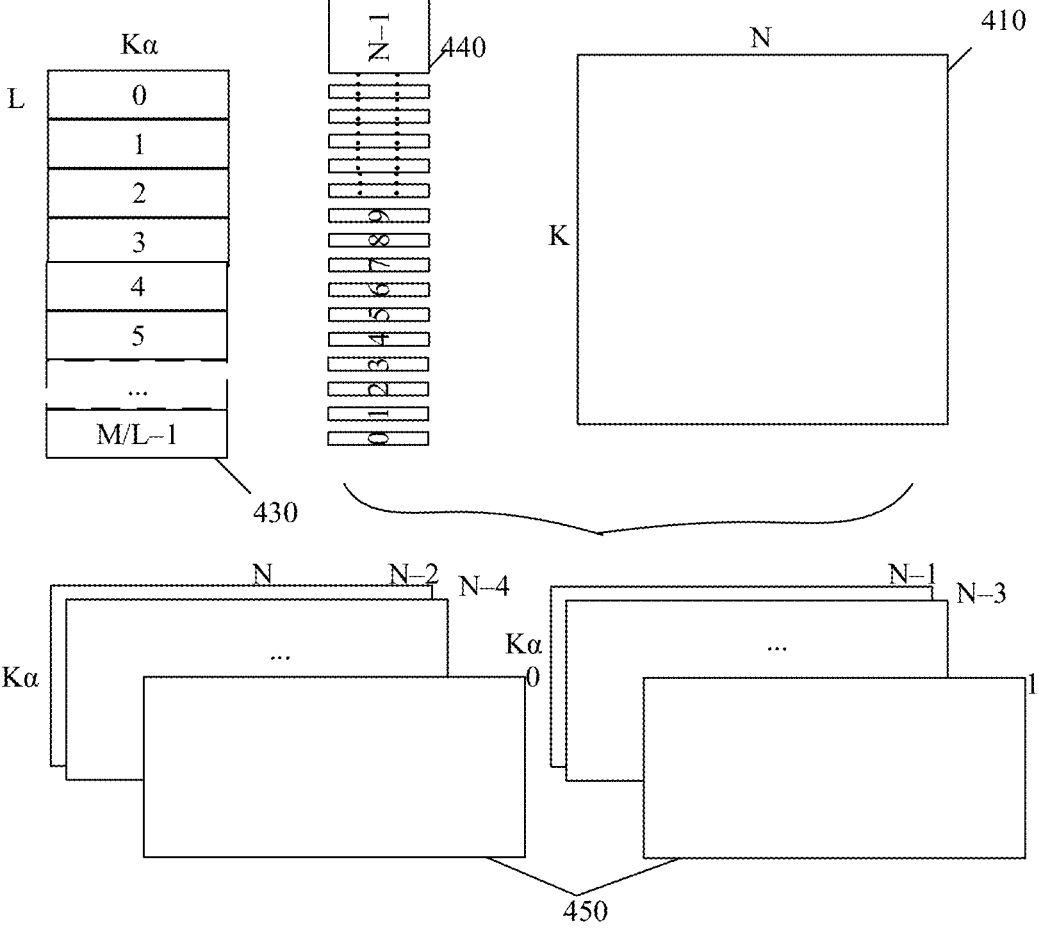
FIG. 8A shows broad-sensed slicing solutions of an excitation matrix and a weight matrix in a tensor engine for excitation-reuse-based sparse DNN inference according to an embodiment of this disclosure.
Figure 8B:
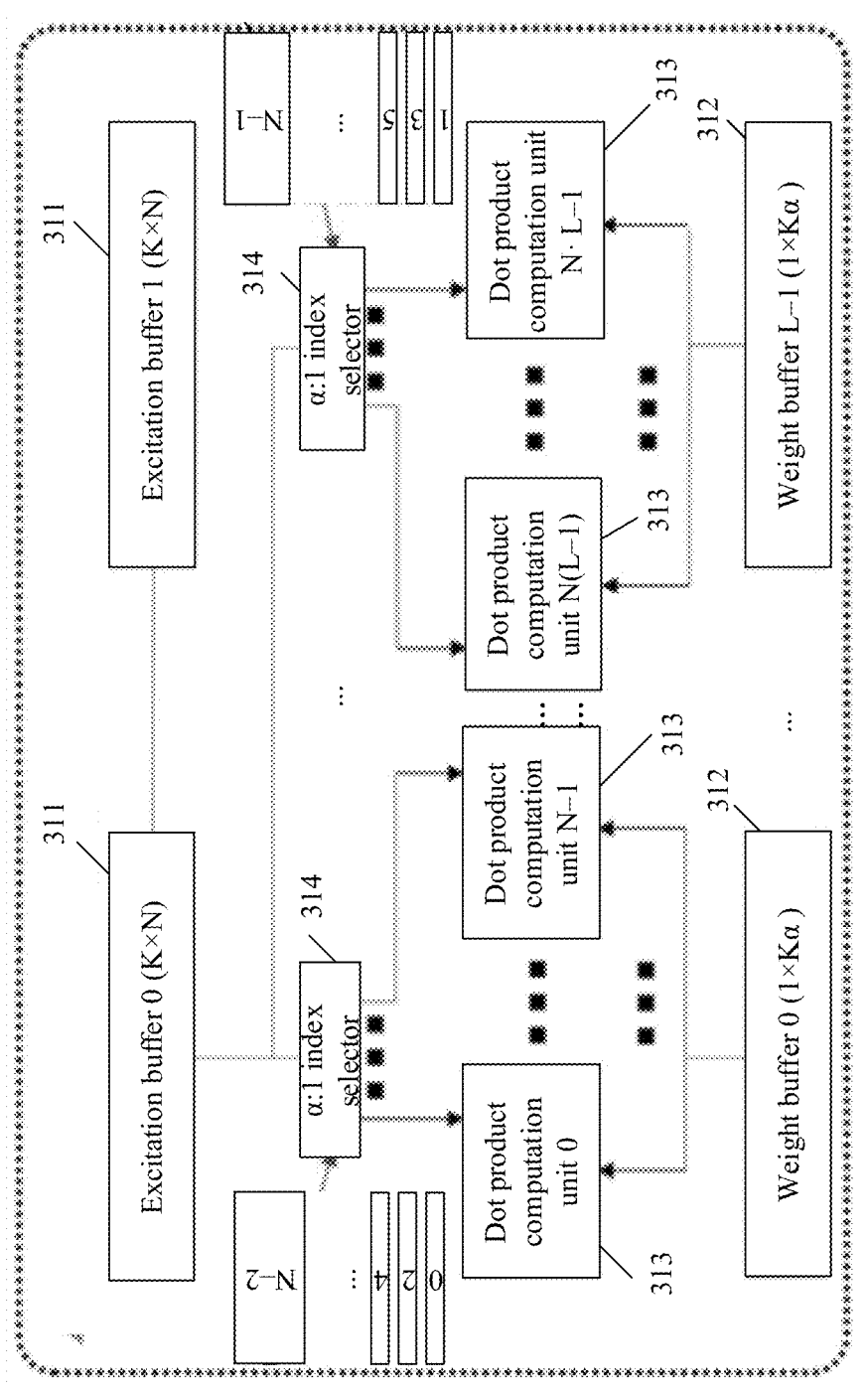
FIG. 8B is a broad-sensed diagram of an internal structure of a tensor engine for excitation-reuse-based sparse DNN inference according to an embodiment of this disclosure.

FIG. 8A is a diagram of slicing solutions of a weight matrix and an excitation matrix in the tensor engine 310 for excitation-reuse-based sparse DNN inference according to an embodiment of this disclosure. Different from the weight-reuse-based solution in which an excitation matrix is sliced in FIG. 6A, in this embodiment of this disclosure, a sparsified weight matrix is sliced, and every L rows in the sparsified weight matrix are used as one slice, where L is a number of weight buffers 312 in FIG. 8B. Each weight buffer 312 is for placing one row vector sequentially fetched from the sparsified weight matrix, so that L row vectors fetched from the sparsified weight matrix can be placed in the L weight buffers 312. It is assumed that the sparsified weight matrix has M rows, and M is a positive integer multiple of L. In this case, the sparsified weight matrix is divided into M/L slices, namely, slices 0 to M/L−1. The weight matrix before being sparsified has K columns, and a sparsity coefficient is α. In this case, the sparsified weight matrix has Kα columns. Therefore, each of the L weight buffers 312 in FIG. 8B stores one 1×Kα row vector. FIG. 7A is a specific example of FIG. 8A. In FIG. 7A, M=K=16, and α=50%. In this case, the weight matrix before being sparsified is a 16×8 matrix, L=2, each sparsified weight matrix slice is a 2×8 matrix slice, the sparsified weight matrix is divided into a total of eight matrix slices, and there are two weight buffers 312.

The weight buffer 312 buffers a 1×Kα row vector in the sparsified weight matrix transferred from the on-chip memory 360 in FIG. 4 to the tensor engine 310. Ina process in which the processing unit 220 preconfigures a deep learning network on the acceleration unit 230, the processing unit 220 sends addresses, in the memory 210, of sparsified weight matrices to the acceleration unit 230 in a form of an instruction. During actual deep learning network inference, the acceleration unit 230 fetches the sparsified weight matrices from corresponding locations in the memory 210 based on these addresses, and places the sparsified weight matrices into the on-chip memory 360. When weights are required in a running process of the tensor engine 310, L rows are sequentially fetched from a sparsified weight matrix, and are respectively placed into the L weight buffers 312, each of which buffers one row, so that the dot product computation unit 313 uses these weights to perform an operation. In the specific example in FIG. 7A, the tensor engine 310 sequentially fetches two rows from the 16×8 sparsified weight matrix, and places the two rows into weight buffers 0 and 1 respectively. There is one 1×8 row vector in each weight buffer.

The excitation buffer 311 is adapted to buffer an excitation matrix transferred from the on-chip memory 360 to the tensor engine 310. After an instruction for actually starting inference is allocated by the command processor 237 to a core 236 for execution, an excitation matrix in the instruction is stored in the on-chip memory 360. The excitation matrix is a K×N excitation matrix. When the tensor engine 310 starts to perform an operation, the K×N excitation matrix is transferred to the excitation buffer 311 for buffering. Because the row vector stored in the weight buffer 312 is a 1×Kα row vector, and the excitation matrix is a K×N excitation matrix, according to a matrix multiplication rule, the row vector cannot be directly multiplied by the excitation matrix. Kα rows need to be selected based on a selection index 440 from K rows of the K×N excitation matrix buffered in an excitation buffer 0, to obtain a Kα×N selected excitation matrix. Then, the 1×Kα row vector can be multiplied by the Kα×N excitation matrix. To be specific, not every row in the K×N excitation matrix is used in a matrix multiplication operation, because some weights are pruned away through weight matrix pruning. Only excitation rows corresponding to weights that are not pruned away need to be used in the multiplication operation, and excitation rows corresponding to the pruned weights do not need to be used in the multiplication operation. In this way, an operation amount of the dot product computation unit 313 is reduced. The weight matrix has M rows, corresponding to M selection indexes 440, namely, selection indexes 0 to M−1. The index selector 314 stores a selection index corresponding to each row vector in the weight matrix, and selects a row of the excitation matrix based on the selection index, to obtain the Kα×N selected excitation matrix. For each row vector in the weight matrix, a different Kα×N selected excitation matrix is obtained through selection, as shown in FIG. 8A. Each of dot product computation units 0 to N−1 fetches a 1×Kα row vector in the sparsified weight matrix from the weight buffer 312, and a corresponding index selector 314 also obtains a corresponding Kα×N selected excitation matrix through selection from the K×N excitation matrix buffered in the excitation buffer 0. Then, the 1×Kα row vector can be multiplied by the corresponding Kα×N selected excitation matrix. Each of the N dot product computation units 313 is responsible for multiply the 1×Kα row vector by a corresponding column in N columns of the Kα×N selected excitation matrix, so that a multiplication result of the 1×Kα row vector and the entire Kα×N selected excitation matrix is obtained after multiplication is performed for all the N columns. In the specific example in FIG. 7A, K=N=16. For each 1×8 row vector stored in the weight buffer 312, the index selector 314 selects eight rows based on selection indexes 440 from the 16 rows of the 16×16 excitation matrix buffered in the excitation buffer 0, to obtain the 8×16 selected excitation matrix. Then, the 1×8 row vector stored in the weight buffer 312 can be multiplied by the 8×16 selected excitation matrix.

Each index selector 314 corresponds to one weight buffer 312. Therefore, there are L index selectors 314. Each index selector 314 stores a selection index of a corresponding row vector in the weight buffer 312, and obtains a corresponding Kα×N selected excitation matrix through selection based on the selection index from the K×N excitation matrix buffered in the excitation buffer 0. All the index selectors 314 may work in parallel, thereby improving running efficiency. Each weight buffer 312 needs N dot product computation units 313 to complete a corresponding multiplication operation, and there are a total of L weight buffers 312. Therefore, there are L·N dot product computation units. In the specific example shown in FIG. 7B, there are two weight buffers 312, corresponding to two index selectors 314, and 2×16=32 dot product computation units 313 are needed.

The excitation buffer 0 in FIG. 8B stores the current K×N excitation matrix used in multiplication of the weight matrix and the current K×N excitation matrix, and a candidate excitation buffer 1 stores a next K×N excitation matrix of the current K×N excitation matrix. Once the dot product computation unit 313 completes a related multiplication operation for the current K×N excitation matrix, the current K×N excitation matrix is unloaded from the excitation buffer 0, and the next K×N excitation matrix stored in the excitation buffer 1 is loaded to the excitation buffer 0. In the specific example in FIG. 7B, the excitation buffer 0 stores a current 16×16 excitation matrix, and the excitation buffer 1 stores a next 16×16 excitation matrix.

Figure 7C:
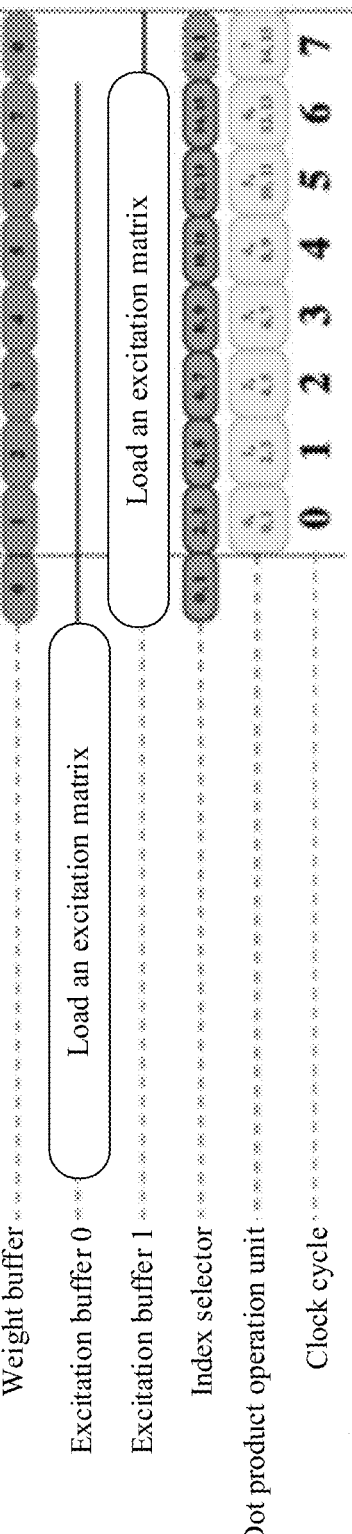
FIG. 7C shows an example of a running time sequence of units in FIG. 7B.
Figure 8C:
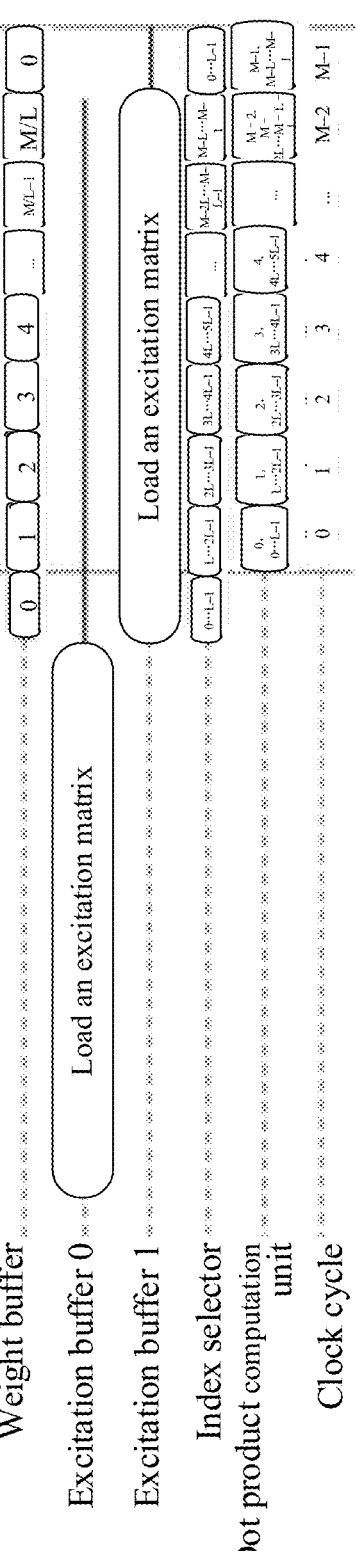
FIG. 8C shows an example of a running time sequence of units in FIG. 8B.

FIG. 8C is a diagram of a running time sequence of a structure of the tensor engine 310 shown in FIG. 8B. Because the sparsified weight matrix is divided into NL weight matrix slices, and each weight matrix slice needs to be multiplied by the excitation matrix to obtain a final multiplication result, entire matrix multiplication is divided into N/L clock cycles. Different selection indexes need to be loaded to the index selector 314 in clock cycles 0 to M/L−1 respectively. A corresponding selection index needs to be loaded to the index selector 314 at least a second predetermined number of clock cycles before the dot product computation unit 313 performs an operation on a weight matrix slice, to ensure that the $K\alpha \times N$ selected excitation matrix is already obtained through selection from the excitation matrix based on the corresponding selection index when the dot product computation unit 313 performs the operation. Otherwise, the dot product computation unit 313 needs to wait until the index selector 314 completes selection before starting the operation. In an embodiment, the second predetermined number may be 1. Similarly, different weight matrix slices 0 to M/L−1 need to be loaded to the weight buffer 312 in the clock cycles 0 to M/L−1 respectively. A corresponding weight matrix slice needs to be loaded to the weight buffer 312 at least a first predetermined number of clock cycles before the dot product computation unit 313 performs an operation on the weight matrix slice, to ensure that the dot product computation unit 313 already obtains the slice before performing the operation on the slice. In an embodiment, the first predetermined number may be 1. The excitation buffer 311 does not need to load an excitation matrix in each clock cycle, because each row of a weight matrix needs to be multiplied by a same excitation matrix. An excitation matrix may be loaded to the excitation buffer 311 at one time, and then, the dot product computation unit 313 uses the excitation matrix in each of the clock cycles 0 to M/L−1; therefore, the excitation matrix may be loaded a third predetermined number of clock cycles before the index selector 314 performs selection based on a selection index, and be retained for M/L clock cycles, as shown in FIG. 8C. In an embodiment, the third predetermined number is M/L+ 1. In the specific example in FIG. 7C, because there are eight sparsified weight matrix slices, matrix multiplication is divided into eight clock cycles. A corresponding selection index needs to be loaded to the index selector 314 one clock cycle before the dot product computation unit 313 performs an operation on a weight matrix slice, to ensure that an 8×16 selected excitation matrix is already obtained through selection from the excitation matrix based on the corresponding selection index when the dot product computation unit 313 performs the operation. Similarly, a corresponding weight matrix slice needs to be loaded to the weight buffer 312 one clock cycle before the dot product computation unit 313 performs an operation on the weight matrix slice, to ensure that the dot product computation unit 313 already obtains the slice before performing the operation on the slice. An excitation matrix may be loaded to the excitation buffer 311 eight clock cycles before the index selector 314 performs selection based on a selection index, and be retained for eight clock cycles, as shown in FIG. 7C.

Figure 7B:
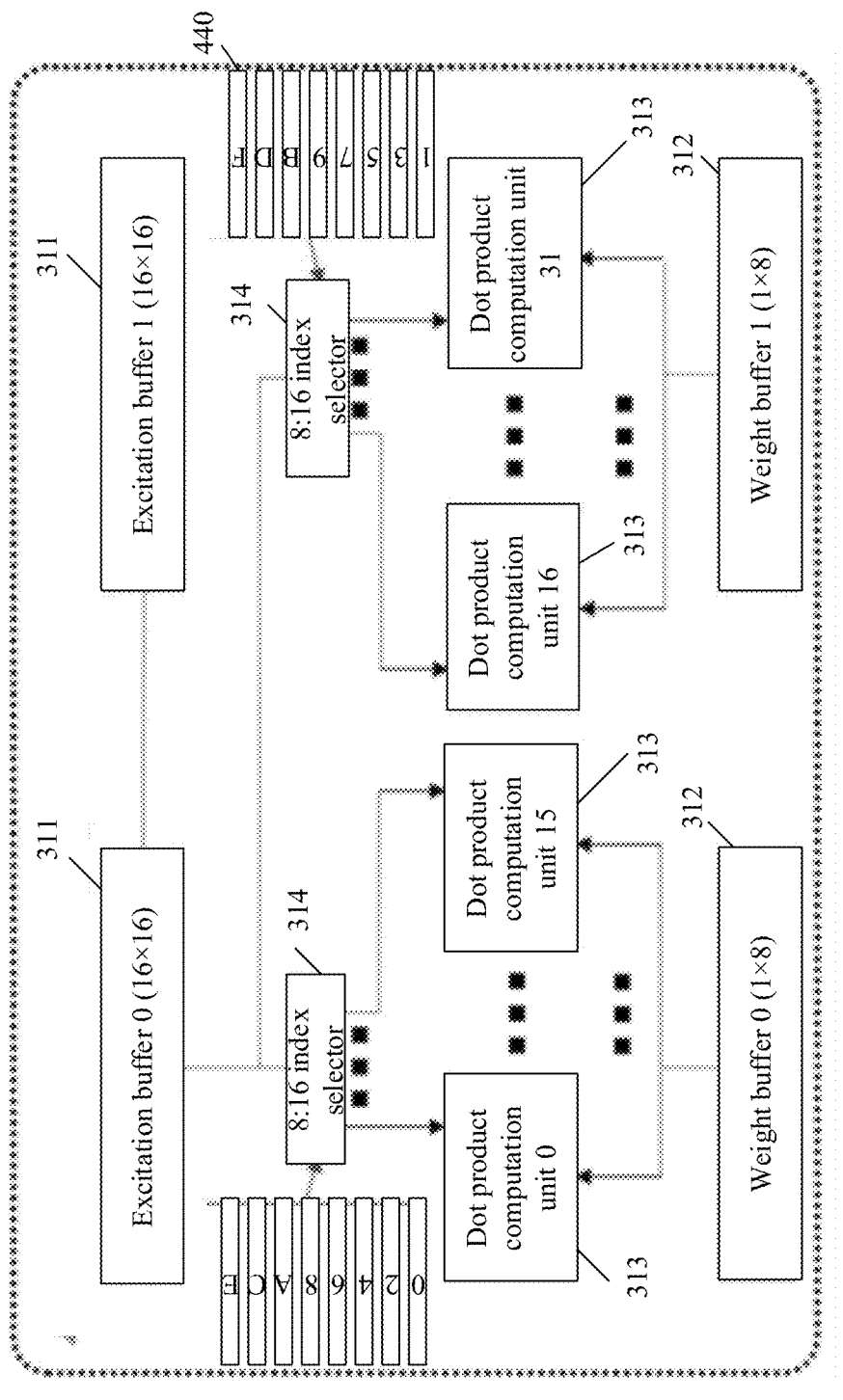
FIG. 7B shows an example of an internal structure of a tensor engine for excitation-reuse-based sparse DNN inference according to an embodiment of this disclosure.

In the example in FIG. 7B, a requirement on a storage capacity of the weight buffer 312 is that at least 2×8 pieces of weight data can be contained. A requirement on a storage capacity of the excitation buffer 311 is that at least (16× 16)×2 pieces of weight data can be contained. Each piece of weight data occupies 16 bits. Therefore, a weight-induced bandwidth requirement is (2×8+number of selection index bytes)×16, a result of which is approximately equal to 256 bits/clock cycle because the number of selection index bytes is negligible. An excitation-induced bandwidth requirement is (16×16/8)×2=512 bits/clock cycle, where a reason for division by 8 is that the excitation buffer 311 does not need to update data in each clock cycle and may update data once in eight clock cycles, as shown in FIG. 7C.

The foregoing lists bandwidth occupation induced by an excitation matrix and bandwidth occupation induced by a weight matrix in the three solutions when M=N=K=16 and α=50%. A table in FIG. 9 shows bandwidth occupation statuses in the weight-reuse-based solution and the excitation-reuse-based solution in the embodiments of this disclosure when M is increased and when N is increased. Data in the second and the third rows in the table indicates bandwidth occupation statuses in the weight-reuse-based solution when M is increased to 32 and when N is increased to 32. Data in the fourth and the fifth rows in the table indicates bandwidth occupation statuses in the excitation-reuse-based solution in the embodiments of this disclosure when M is increased to 32 and when N is increased to 32. For the weight-reuse-based solution, when M is increased to 32, a sum of an excitation-induced occupied bandwidth, a weight-induced occupied bandwidth, and a selection-index-induced occupied bandwidth is 800 bits/clock cycle, and in addition to an occupied bandwidth of 1024 bits/clock cycle in other aspects, a total occupied bandwidth is 1824 bits/clock cycle; when N is increased to 32, a sum of an excitation-induced occupied bandwidth, a weight-induced occupied bandwidth, and a selection-index-induced occupied bandwidth is 656 bits/clock cycle, and in addition to an occupied bandwidth of 1024 bits/clock cycle in other aspects, a total occupied bandwidth is 1680 bits/clock cycle. For the excitation-reuse-based solution in the embodiments of this disclosure, when M is increased to 32, a sum of an excitation-induced occupied bandwidth, a weight-induced occupied bandwidth, and a selection-index-induced occupied bandwidth is 544 bits/clock cycle, and in addition to an occupied bandwidth of 1024 bits/clock cycle in other aspects, a total occupied bandwidth is 1568 bits/clock cycle; when N is increased to 32, a sum of an excitation-induced occupied bandwidth, a weight-induced occupied bandwidth, and a selection-index-induced occupied bandwidth is 800 bits/clock cycle, and in addition to an occupied bandwidth of 1024 bits/clock cycle in other aspects, a total occupied bandwidth is 1824 bits/ clock cycle. Therefore, when M is increased, the excitation-reuse-based solution in the embodiments of this disclosure can be used to minimize occupied register file bandwidth. Moreover, a ping-pong buffer design in a weight-reuse-based tensor engine is not used in the excitation-reuse-based solution, and therefore, the excitation-reuse-based solution is free of a timing constraint.

Although the foregoing embodiments have mentioned that the embodiments of this disclosure do not require the ping-pong buffer design and are free of a timing constraint, yet the ping-pong buffer design may be used alternatively. After ping-pong buffers are used, both a current excitation matrix and a next excitation matrix may be loaded by using the ping-pong buffers, instead of waiting until an operation for an excitation matrix is completed before loading a next excitation matrix. After a dot product operation for the current excitation matrix is completed, dot product multiplication is directly performed for the next excitation matrix. Compared with a solution in which a next excitation matrix is loaded after an operation for a current excitation matrix is completed, this solution is more efficient. In the embodiment, the excitation buffer includes a first excitation buffer and a second excitation buffer (not shown). The two excitation buffers are of the ping-pong buffer design. The first excitation buffer and the second excitation buffer are respectively adapted to store a current excitation matrix and a next excitation matrix. The first excitation buffer and the second excitation buffer are both connected to the index selector 314. After the dot product computation unit 313 completes multiplication of each row vector in a sparsified weight matrix and a selected current excitation matrix, the index selector 314 switches to selection in the second excitation buffer, and the dot product computation unit 313 starts to perform multiplication of each row vector in the sparsified weight matrix and a selected next excitation matrix.

Procedure of a Deep Neural Network Running Method According to an Embodiment of this Disclosure As shown in FIG. 10, according to an embodiment of this disclosure, a deep neural network running method is further provided, including:

Step 610: Fetch a row vector from an M×Kα sparsified weight matrix, and place the row vector into a weight buffer, where M and K are respectively a number of rows and a number of columns of the weight matrix before being sparsified, and α is a sparsity coefficient.

Step 620: Place a K×N excitation matrix into an excitation buffer.

Step 630: Place a selection index corresponding to the row vector into an index selector.

Step 640: Perform selection on the excitation matrix based on the selection index by using the index selector, to obtain a Kα×N selected excitation matrix.

Step 650: Multiply the row vector by the selected excitation matrix by using a dot product computation unit.

Optionally, there are L weight buffers; and step 610 includes: sequentially fetching L row vectors from the sparsified weight matrix, and placing the L row vectors into the L weight buffers respectively.

Optionally, there are L index selectors; and step 630 includes: placing selection indexes corresponding to the L row vectors into the L index selectors.

Optionally, there are L·N dot product computation units; and step 650 includes: multiplying the L row vectors by N column vectors in the selected excitation matrix by using the L·N dot product computation units respectively.

Optionally, step 650 includes: setting M/L clock cycles for multiplication of the weight matrix and the excitation matrix, where M is an integer multiple of L; and in a single clock cycle, multiplying the row vector in the weight buffer by the N column vectors in the selected excitation matrix by using N dot product computation units corresponding to the row vector.

Optionally, step 610 includes: placing the fetched row vector into the weight buffer a first predetermined number of clock cycles before a clock cycle in which the dot product computation unit performs a multiplication operation on the row vector.

Optionally, step 630 includes: placing the selection index into the index selector a second predetermined number of clock cycles before a clock cycle in which the dot product computation unit performs a multiplication operation on the selected excitation matrix obtained through selection based on the selection index.

Optionally, step 620 includes: placing the excitation matrix into the excitation buffer a third predetermined number of clock cycles before a clock cycle in which the dot product computation unit performs a multiplication operation on the first selected excitation matrix obtained through selection from the excitation matrix, and retaining the excitation matrix for M/L clock cycles.

Implementation details of the foregoing process are described in detail in descriptions of the foregoing apparatus embodiments, and therefore are not described again.

Commercial Value of Embodiments of this Disclosure

Experiments have verified that, according to the embodiments of this disclosure, when a tensor engine performs multiplication of a sparsified weight matrix and an excitation matrix, efficiency is doubled and bandwidth occupation is reduced by 10% to 40%. This greatly improves tensor engine performance, and is promising in the market.

It should be understood that each embodiment in this specification is described in a progressive manner. For same or similar parts of the embodiments, cross reference may be made. Each embodiment is focused on a difference from other embodiments. Particularly, the method embodiments are basically similar to the methods described in the apparatus and system embodiments, and therefore are described briefly. For related parts, refer to some descriptions in other embodiments.

It should be understood that specific embodiments of this specification are described above. Other embodiments fall within the scope of the claims. In some cases, actions or steps described in the claims may be performed in a sequence different from that in the embodiments, and a desired result can still be achieved. In addition, a process depicted in the accompanying drawings does not necessarily need to be performed in a shown specific sequence or consecutive sequence to achieve the desired result. In some implementations, multitask processing and parallel processing are also feasible or may be advantageous.

It should be understood that, when an element is described in a singular form in this specification or is shown as only one element in the accompanying drawings, it does not indicate that the number of elements is limited to 1. In addition, modules or elements described or shown as separate in this specification may be combined into a single module or element, and a module or an element described or shown as a single module or element in this specification may be divided into a plurality of modules or elements.

It should be further understood that terms and expressions used in this specification are merely intended for description, and one or more embodiments in this specification shall not be limited to these terms or expressions. Using these terms and expressions do not mean that equivalent features of any example and description (or a part thereof) are excluded. It should be realized that various possible modifications shall also fall within the scope of the claims. Other modifications, variations, and replacements are also possible. Correspondingly, the claims shall be considered as covering all of these equivalents.

The invention claimed is:

1. A computation unit, comprising:

a weight buffer adapted to store a row vector fetched from an M×Kα sparsified weight matrix, wherein M and K are respectively a number of rows and a number of columns of the weight matrix before being sparsified, and a is a sparsity coefficient;

an excitation buffer adapted to store a K×N excitation matrix, where K and N are respectively a number of rows and a number of columns of the excitation matrix;

an index selector adapted to store a selection index corresponding to the row vector, and select a row of the excitation matrix based on the selection index, to obtain a Kα×N selected excitation matrix; and a dot product computation unit adapted to multiply the row vector by the selected excitation matrix.

2. The computation unit according to claim 1, wherein there are L weight buffers for respectively storing L row vectors that are sequentially fetched from the sparsified weight matrix, there are L index selectors for respectively storing selection indexes corresponding to the L row vectors, and there are L·N dot product computation units for respectively multiplying the L row vectors by N column vectors in the selected excitation matrix.

3. The computation unit according to claim 2, wherein L=2.

4. The computation unit according to claim 2, wherein the dot product computation unit sets M/L clock cycles for multiplication of the weight matrix and the excitation matrix, wherein M is an integer multiple of L; and in a single clock cycle, the row vector in the weight buffer is multiplied by the N column vectors in the selected excitation matrix by using N dot product computation units corresponding to the row vector.

5. The computation unit according to claim 2, wherein the row vector is loaded to the weight buffer a first predetermined number of clock cycles before a clock cycle in which the dot product computation unit performs a multiplication operation on the row vector.

6. The computation unit according to claim 5, wherein the first predetermined number is 1.

7. The computation unit according to claim 2, wherein the selection index is loaded to the index selector a second predetermined number of clock cycles before a clock cycle in which the dot product computation unit performs a multiplication operation on the selected excitation matrix obtained through selection based on the selection index.

8. The computation unit according to claim 7, wherein the second predetermined number is 1.

9. The computation unit according to claim 2, wherein the excitation matrix is loaded to the excitation buffer a third predetermined number of clock cycles before a clock cycle in which the dot product computation unit performs a multiplication operation on the first selected excitation matrix obtained through selection from the excitation matrix, and is retained for M/L clock cycles.

10. The computation unit according to claim 9, wherein the third predetermined number is M/L+1.

11. The computation unit according to claim 9, further comprising:

a candidate excitation buffer adapted to store a next excitation matrix, wherein once the excitation matrix is unloaded from the excitation buffer, the next excitation matrix stored in the candidate excitation buffer is loaded to the excitation buffer.

12. The computation unit according to claim 1, wherein the excitation buffer comprises a first excitation buffer and a second excitation buffer that serve as ping-pong buffers, respectively adapted to store a current excitation matrix and a next excitation matrix; wherein the first excitation buffer and the second excitation buffer are both connected to the index selector; and after the dot product computation unit completes multiplication of each row vector in the sparsified weight matrix and a selected current excitation matrix, the index selector switches to selection in the second excitation buffer.

13. A deep neural network running method, comprising:

fetching a row vector from an M×Kα sparsified weight matrix, and placing the row vector into a weight buffer, wherein M and K are respectively a number of rows and a number of columns of the weight matrix before being sparsified, and α is a sparsity coefficient;

placing a K×N excitation matrix into an excitation buffer, where K and N are respectively a number of rows and a number of columns of the excitation matrix;

placing a selection index corresponding to the row vector into an index selector;

performing selection on the excitation matrix based on the selection index by using the index selector, to obtain a Kα×N selected excitation matrix; and multiplying the row vector by the selected excitation matrix by using a dot product computation unit.

14. The method according to claim 13, wherein there are L weight buffers; and the fetching a row vector from an M×Kα sparsified weight matrix, and placing the row vector into a weight buffer comprises: sequentially fetching L row vectors from the sparsified weight matrix, and placing the L row vectors into the L weight buffers respectively.

15. The method according to claim 14, wherein there are L index selectors; and the placing a selection index corresponding to the row vector into an index selector comprises: placing selection indexes corresponding to the L row vectors into the L index selectors.

16. The method according to claim 14, wherein there are L·N dot product computation units; and the multiplying the row vector by the selected excitation matrix by using a dot product computation unit comprises: multiplying the L row vectors by N column vectors in the selected excitation matrix by using the L·N dot product computation units respectively.

17. The method according to claim 16, wherein the multiplying the row vector by the selected excitation matrix comprises:

setting M/L clock cycles for multiplication of the weight matrix and the excitation matrix, wherein M is an integer multiple of L; and in a single clock cycle, multiplying the row vector in the weight buffer by the N column vectors in the selected excitation matrix by using N dot product computation units corresponding to the row vector.

18. The method according to claim 17, wherein the fetching a row vector from an M×Kα sparsified weight matrix, and placing the row vector into a weight buffer comprises: placing the fetched row vector into the weight buffer a first predetermined number of clock cycles before a clock cycle in which the dot product computation unit performs a multiplication operation on the row vector.

19. The method according to claim 17, wherein the placing a selection index corresponding to the row vector into an index selector comprises:

placing the selection index into the index selector a second predetermined number of clock cycles before a clock cycle in which the dot product computation unit performs a multiplication operation on the selected excitation matrix obtained through selection based on the selection index.

20. The method according to claim 17, wherein the placing a K×N excitation matrix into an excitation buffer comprises:

placing the excitation matrix into the excitation buffer a third predetermined number of clock cycles before a clock cycle in which the dot product computation unit performs a multiplication operation on the first selected excitation matrix obtained through selection from the excitation matrix, and retaining the excitation matrix for M/L clock cycles.

* * * * *